(12) United States Patent
Lee et al.

(10) Patent No.: US 10,310,640 B2
(45) Date of Patent: Jun. 4, 2019

(54) MOBILE TERMINAL COMPRISING STYLUS PEN AND TOUCH PANEL, AND CONTROL METHOD THEREFOR

(71) Applicant: LG ELECTRONICS INC., Seoul (KR)

(72) Inventors: Jungjoon Lee, Seoul (KR); Masashi Hashimoto, Seoul (KR); Hyunjai Shim, Seoul (KR); Younghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/548,249

(22) PCT Filed: Jun. 18, 2015

(86) PCT No.: PCT/KR2015/006185
§ 371 (c)(1),
(2) Date: Aug. 2, 2017

(87) PCT Pub. No.: WO2016/125962
PCT Pub. Date: Aug. 11, 2016

(65) Prior Publication Data
US 2018/0018028 A1 Jan. 18, 2018

(30) Foreign Application Priority Data
Feb. 4, 2015 (KR) .................. 10-2015-0017627

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *G06F 3/044* (2013.01); *G06F 3/0416* (2013.01)

(58) Field of Classification Search
CPC ...... G06F 3/0383; G06F 3/0416; G06F 3/044; G06F 3/03545
See application file for complete search history.

(56) References Cited

U.S. PATENT DOCUMENTS

| 2014/0009215 A1* | 1/2014 | Prest ................. G06F 3/044 327/517 |
| 2014/0078101 A1* | 3/2014 | Katsurahira ............ G06F 3/044 345/174 |

(Continued)

FOREIGN PATENT DOCUMENTS

| JP | 4866941 B2 | 2/2012 |
| KR | 10-2011-0057501 A | 6/2011 |

(Continued)

*Primary Examiner* — Andrew Sasinowski
(74) *Attorney, Agent, or Firm* — Birch, Stewart, Kolasch & Birch, LLP

(57) ABSTRACT

A mobile terminal including a touch panel including a plurality of touch panel electrodes; a stylus pen configured to perform transmission and reception of an electric signal with the touch panel using capacitive coupling and without using a separate power supply to the stylus pen; and a controller configured to, when the electric signal is received from the stylus pen through the capacitive coupling, detect a location of the stylus pen with respect to the touch panel based on signal magnitudes of at least two touch panel electrodes from which the electrical signal is detected.

10 Claims, 12 Drawing Sheets

(51) Int. Cl.
*G06F 3/041* (2006.01)
*G06F 3/044* (2006.01)

(56) References Cited

U.S. PATENT DOCUMENTS

| | | | |
|---|---|---|---|
| 2014/0078104 A1* | 3/2014 | Lee | G06F 3/044 345/174 |
| 2014/0267129 A1* | 9/2014 | Rebeschi | G06F 3/0418 345/174 |
| 2014/0354555 A1* | 12/2014 | Shahparnia | G06F 3/03545 345/173 |
| 2014/0375593 A1* | 12/2014 | Singh | G06F 3/0416 345/174 |
| 2015/0162932 A1* | 6/2015 | Page | G01R 27/2605 324/658 |

FOREIGN PATENT DOCUMENTS

| | | |
|---|---|---|
| KR | 10-2013-0108614 A | 10/2013 |
| KR | 10-1366227 B1 | 2/2014 |
| KR | 10-2014-0038325 A | 3/2014 |

\* cited by examiner

MOBILE TERMINAL COMPRISING STYLUS PEN AND TOUCH PANEL, AND CONTROL METHOD THEREFOR

CROSS-REFERENCE TO RELATED APPLICATIONS

This application is the National Phase of PCT International Application No. PCT/KR2015/006185, filed on Jun. 18, 2015, which claims priority under 35 U.S.C. 119(a) to Patent Application No. 10-2015-0017627, filed in Republic of Korea on Feb. 4, 2015, all of which are hereby expressly incorporated by reference into the present application.

TECHNICAL FIELD

The present invention relates to a mobile terminal having a stylus pen and a touch panel, and more particularly, a mobile terminal capable of transmitting and receiving an electric signal between a touch panel and a stylus pen.

BACKGROUND ART

Touch panels are used as means for inputting characters and pictures in various electronic devices such as cellular (or mobile) phones and personal computers. The touch panel senses a touch of a hand or a stylus pen and performs signal processing for switching the touch into an electric signal.

When an electronic circuit is disposed in a stylus pen, not only a simple touch input but also a mouse function such as selecting or dragging a part of an image by generating an electric signal from the stylus pen may be performed. In this manner, when the electronic circuit is disposed in the stylus pen, power is required to operate the electronic circuit of the stylus pen. For example, there is a method of supplying power from a battery which is provided in the stylus pen.

On the other hand, recently, a method has been used in which a separate dedicated panel for power supply is provided in a main body of a cellular phone, and necessary power is supplied wirelessly from the separate dedicated panel to the stylus pen.

A power supply technique disclosed in Patent Document JP 4866941 B is performed by a separate power transmission device 4 disposed beneath an LCD module 3 in a smart phone. Here, the power transmission device 4 transmits electric power to a coil inside a stylus pen through an induction coil. That is, in Patent Document 1, the separate power transmission device including an induction coil is disposed beneath the LCD module to supply power to the stylus pen, such that power is transmitted and received through inductive coupling between the coil of the stylus pen and the power transmission device.

However, as described above, the structure that the power transmission device including the induction coil is separately installed beneath the LCD module to supply power to the stylus pen causes an increase in cost and also an increase in a thickness of a cellular phone. When an electrode line of a touch panel is made of a coil, since a resistance component due to the electrode line of the touch panel is large, energy is discharged as heat due to the resistance before the circuit is resonated, and thereby the circuit fails to be resonated.

In order to solve such problems, there is an increasing need for a technology for supplying power to a stylus pen using an existing touch panel and detecting a signal received from the stylus pen, without using a separate power transmission device.

DISCLOSURE OF THE INVENTION

Therefore, to obviate those problems, an aspect of the present invention is to provide a mobile terminal having a stylus pen and a touch panel, capable of transmitting and receiving an electric signal between the touch panel and the stylus pen using capacitive coupling, and a method of controlling the same.

Another aspect of the present invention is to provide a mobile terminal having a stylus pen and a touch panel, capable of providing an optimized method for detecting a location (position) of the stylus pen through capacitive coupling, and a method of controlling the same.

Another aspect of the present invention is to provide a mobile terminal having a stylus pen and a touch panel, capable of providing a method of improving speed for detecting a location of the stylus pen through capacitive coupling, and a method of controlling the same.

Another aspect of the present invention is to provide a mobile terminal having a stylus pen and a touch panel, capable of providing a method of enhancing accuracy of a location of the stylus pen through capacitive coupling, and a method of controlling the same.

To achieve these and other advantages and in accordance with the purpose of the present invention, as embodied and broadly described herein, there is provided a mobile terminal having a stylus pen, the terminal including a touch panel provided with a plurality of touch panel electrodes, a stylus pen configured to perform transmission and reception of an electric signal with the touch panel, using capacitive coupling, and a controller configured to detect a location of the stylus pen based on signal magnitudes of at least two touch panel electrodes, from which an electric signal is detected, when an electric signal is received from the stylus pen through the capacitive coupling.

In an embodiment disclosed therein, the touch panel may include a plurality of TX electrodes, and a plurality of RX electrodes arranged by intersecting with the TX electrodes. The location of the stylus pen may be detected based on at least one of a signal magnitude of a TX electrode, by which the electric signal is detected, of the plurality of TX electrodes, and a signal magnitude of an RX electrode, by which the electric signal is detected, of the plurality of RX electrodes.

In an embodiment disclosed therein, the controller may decide first and second TX electrodes of the plurality of TX electrodes and first and second RX electrodes of the plurality of RX electrodes, based on a magnitude of the electric signal detected by the plurality of TX electrodes and the plurality of RX electrodes, and detect the location of the stylus pen using signal magnitudes of the first and second TX electrodes and signal magnitudes of the first and second RX electrodes.

In an embodiment disclosed therein, the first and second TX electrodes may be two TX electrodes adjacent to a point where the stylus pen is located among the plurality of TX electrodes, and the first and second RX electrodes may be two RX electrodes adjacent to the point where the stylus pen is located among the plurality of RX electrodes.

In an embodiment disclosed therein, the mobile terminal may further include a voltage supply unit configured to generate a voltage to be applied to the touch panel, and the controller may apply voltages having different phases to the touch panel, and detect the location of the stylus pen based on a phase of the electric signal received from the stylus pen.

In an embodiment disclosed therein, the touch panel may include a plurality of TX electrodes supplying an electric signal to the stylus pen, and a plurality of RX electrodes arranged by intersecting with the TX electrodes, and detecting an electric signal received from the stylus pen. The controller may apply the voltages having the different phases to the plurality of TX electrodes in a preset manner, to detect TX electrodes adjacent to the point where the stylus pen is located based on the electric signal detected by the RX electrode.

In an embodiment disclosed therein, the controller may apply the voltages having the different phases to at least some of the plurality of TX electrodes, and may not apply a voltage to TX electrodes, except for the at least some TX electrodes, of the plurality of TX electrodes.

In an embodiment disclosed therein, the controller may apply the voltages having the different phases to the plurality of TX electrodes at an interval of a specific number of electrodes.

In an embodiment disclosed therein, when a voltage having a first phase, among the voltages having the different phases, is applied to one of the plurality of TX electrodes, a voltage having a second phase, different from the first phase, may be applied to a TX electrode arranged after at least one TX electrode, with respect to the one TX electrode receiving the voltage having the first phase.

In an embodiment disclosed therein, the stylus pen may receive an electric signal from one of the TX electrodes, to which the voltages having the different phases have been applied, and the controller may decide the one TX electrode based on a phase of a first electric signal when the first electric signal is received from the stylus pen.

In an embodiment disclosed therein, the controller may apply the voltages having the different phases to TX electrodes without a voltage applied thereto, of the plurality of TX electrodes, at the interval of the specific number of electrodes.

In an embodiment disclosed therein, when a second electric signal different from the first electric signal is received from the stylus pen, which has received an electric signal from another TX electrode different from the one TX electrode, the controller may decide the another TX electrode based on the received second electric signal, and decide two TX electrodes adjacent to the point where the stylus pen is located based on the one TX electrode and the another TX electrode.

In an embodiment disclosed therein, the controller may detect at least two ratios of capacitances formed between the touch panel and the stylus pen, based on the electric signal received from the stylus pen, and detect the location of the stylus pen using the detected ratios of capacitances.

In an embodiment disclosed therein, the touch panel may include a plurality of TX electrodes supplying an electric signal to the stylus pen, and a plurality of RX electrodes arranged by intersecting with the TX electrodes and detecting an electric signal received from the stylus pen. The at least two ratios of capacitances may include a first capacitance ratio formed between the stylus pen and the TX electrodes, and a second capacitance ratio formed between the stylus pen and the RX electrodes.

In an embodiment disclosed therein, the first capacitance ratio may be a ratio of two capacitances formed between the stylus pen and two TX electrodes adjacent to the stylus pen, of the plurality of TX electrodes, and the second capacitance ratio may be a ratio of two capacitances formed between the stylus pen and two RX electrodes adjacent to the stylus pen, of the plurality of RX electrodes.

In an embodiment disclosed therein, the controller may detect the first and second capacitance ratios based on a signal magnitude detected from at least one of the two RX electrodes adjacent to the stylus pen.

In an embodiment disclosed therein, the first capacitance ratio may be detected based on magnitudes of electric signals detected at different times by one of the two RX electrodes, and the second capacitance ratio may be detected based on signal magnitudes of the two RX electrodes.

In an embodiment disclosed therein, the electric signals detected at the different times may include a first electric signal received by the one RX electrode from the stylus pen after an electric signal is supplied to the stylus pen from one of two TX electrodes adjacent to the stylus pen, and a second electric signal detected by the one RX electrode after an electric signal is supplied from the one TX electrode and an electric signal is supplied from another TX electrode different from the one TX electrode to the stylus pen.

In an embodiment disclosed therein, the mobile terminal may further include a differential amplifier connected to the plurality of RX electrodes in a preset manner and configured to remove noise included in electric signals detected by the plurality of RX electrodes, and the controller may detect the first and second capacitance ratios based on an output signal of the differential amplifier.

A method for controlling a mobile terminal according to one embodiment of the present invention, which is a control method for a mobile terminal of controlling a touch panel provided with a plurality of TX electrodes and a plurality of RX electrodes arranged by intersecting with the plurality of TX electrodes, may include applying voltages having different phases to the plurality of TX electrodes in a preset manner, and deciding two TX electrodes and two RX electrodes adjacent to a point where a stylus pen is located, based on an electric signal received from the stylus pen, detecting a first capacitance ratio formed between the stylus pen and the two TX electrodes and a second capacitance ratio formed between the stylus pen and the two RX electrodes, based on a magnitude of an electric signal detected by the decided two RX electrodes, and detecting a location of the stylus pen based on the first and second capacitance ratios.

According to the present invention, transmission and reception of an electric signal with a stylus pen can be performed by using an existing touch panel. Therefore, a separate power supply unit made of a coil does not have to be provided, which may result in further reducing a fabricating cost and a thickness of a mobile terminal.

In addition, the present invention can supply an electric signal to the stylus pen through capacitive coupling and apply a touch to the touch panel through an electric signal generated in a resonance state. Therefore, the present invention can provide the stylus pen implemented merely by a more simplified circuit, without a separate power supply unit, thereby further reducing a fabricating cost and a weight of the stylus pen.

In addition, the present invention can electrically connect an LC circuit provided in the stylus pen to a pen tip formed of a conductor, so as to increase a magnitude of an electric signal transmitted and received between the stylus pen and the touch panel through capacitive coupling, and accordingly remarkably increase recognition of a touch applied by the stylus pen.

In addition, the present invention can simultaneously drive all of TX electrodes provided in the touch panel to supply an electric signal to the stylus pen. Further, according to the present invention, an electric signal received from the stylus pen can be detected by using the TX electrodes as well as RX electrodes provided in the touch panel, and a location of the stylus pen can be detected based on magnitudes of detected electric signals of the TX and RX electrodes. Therefore, according to the present invention, the location of the stylus pen can be detected remarkably fast, as compared with the related art capacitive touch method of obtaining coordinates of a touch point based on an electric signal detected by RX electrodes while driving the TX electrodes provided in the touch panel one by one.

Further, according to the present invention, voltages having different phases can be simultaneously applied to a plurality of TX electrodes, and the location of the stylus pen can be detected quickly based on a phase of an electric signal received from the stylus pen.

Further, according to the present invention, the location of the stylus pen can be detected using a ratio of capacitances formed between the stylus pen and the TX electrodes and a ratio of capacitances formed between the stylus pen and the RX electrodes, thereby remarkably enhancing accuracy of detecting the location of the stylus pen.

DETAILED DESCRIPTION OF EMBODIMENTS OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1:
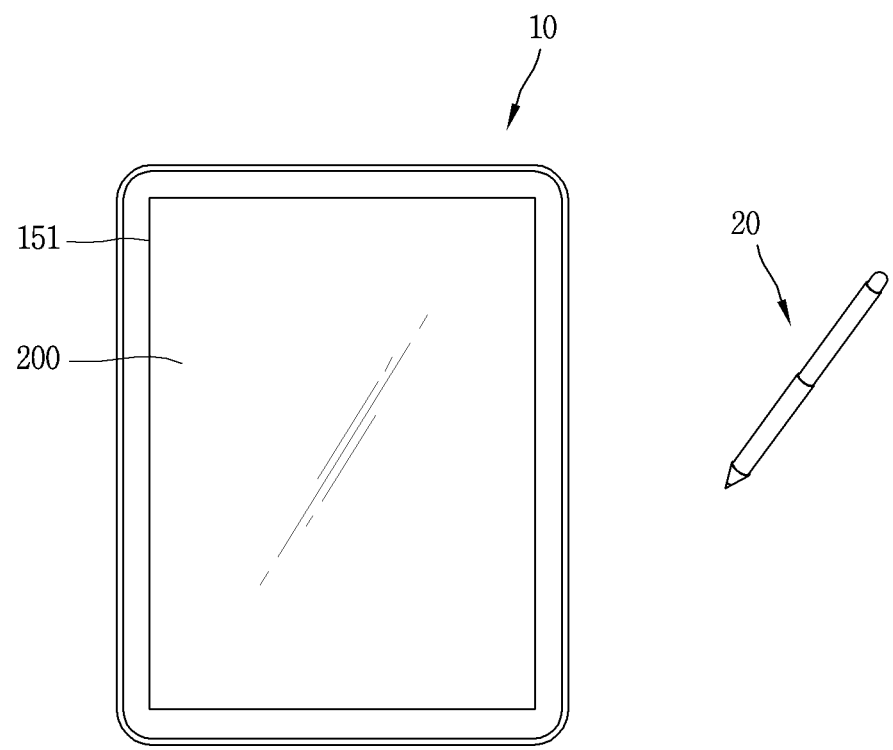
FIG. 1 is a conceptual view illustrating a mobile terminal having a stylus pen and a touch panel.

Referring to FIG. 1, FIG. 1 is a conceptual view of a mobile terminal having a stylus pen and a touch panel. The mobile terminal 10 according to an embodiment of the present invention includes a display unit 151 (or a touch screen 151), a controller (or a control unit, not illustrated), a stylus pen 20, and the like. The display unit 151 may include a touch panel 200 (or a touch sensor) that detects (senses) a touch to the display unit 151 so that a control command can be received by a touch method.

The touch panel 200 may be configured in a form of a film having a touch pattern to be disposed between a window (not illustrated) of the display unit 151 and a display (not illustrated) on a rear surface of the window, or configured as a metal wire directly patterned on the rear surface of the window. Alternatively, the touch panel 200 may be formed integrally with the display. For example, the touch panel 200 may be disposed on a substrate of the display, or may be provided within the display.

That is, the display unit 151 may have an inter-layered structure with the touch panel 200 or may be integrally formed with the touch panel 200, to realize a touch screen. The display unit 151 may function as a user input unit for providing an input interface between the mobile terminal 10 and the user and simultaneously provide an output interface between the mobile terminal 10 and the user. The display unit 151 may display (output) information processed by the mobile terminal 10. For example, the display unit 151 may display execution screen information of an application program driven by the mobile terminal 10, or User Interface (UI) and Graphic User Interface (GUI) information according to the execution screen information.

The display unit 151 may sense a touch (or a touch input) applied to the touch screen (or the display unit 151) by using the touch panel 200 in a capacitive manner. As an example, the touch panel 200 may be configured to convert a change in pressure applied to a specific portion of the touch screen or a capacitance generated in the specific portion into an electric input signal. The touch panel 200 may be configured to detect a position, an area, pressure, a capacitance, and the like with respect to a touch when the touch is applied by a touch object to the touch sensor of the display unit 151. Here, the touch object may be an object that applies a touch to the touch sensor, for example, a finger, a touch pen, the stylus pen 20, a pointer, or the like.

When a touch input is applied to the touch panel 200, a corresponding signal (s) is sent to a signal receiving unit (or a touch controller). The signal receiving unit processes the signal (s) and then transmits corresponding data to the controller. Thus, the controller 180 may recognize which area of the display unit 151 has been touched or the like. Here, the signal receiving unit may be a separate component from the controller, or the controller itself.

Meanwhile, the controller may perform different controls or perform the same control according to a type of a touch object applying a touch to the touch screen (or a touch key provided on the touch screen). Whether to perform the different controls or the same control according to the type of the touch object may be decided according to a current operating state of the mobile terminal 100 or a currently-executed application program.

There may be two or more display units 151 according to an embodiment of the mobile terminal 10. In this case, the mobile terminal 10 may be provided with a plurality of display portions spaced apart from one another or may be disposed integrally with each other, or may be disposed on different surfaces.

The mobile terminal 10 may detect a touch (or an input) applied by at least one of the stylus pen 20 as a first input tool and a finger as a second input tool using the touch panel 200. Specifically, when a touch is applied by at least one of the first and second input tools, the touch panel 200 transmits a signal generated by the touch to the controller. Also, the controller 180 may determine a type of the input tool, by which the touch has been applied, based on the transmitted signal. Further, the controller 180 may detect a point (position, part) where the touch has been applied based on the transmitted signal.

Hereinafter, the stylus pen will be described as an example of means for inputting a user command on the touch panel. The present invention relates to a method for supplying an electric signal with such a stylus pen and sensing an electric signal transmitted from the stylus pen.

Specifically, the present invention relates to a method of applying a voltage to an electrode of the touch panel 200, and supplying an electric signal from the electrode of the touch panel 200 to the stylus pen 20 through coupling capacitance (capacitive coupling) formed between the stylus pen 20 and the electrode of the touch panel 200. The present invention also relates to a method of transferring an electric signal (e.g., an LC resonance signal) generated in the stylus pen 20 to the touch panel 200 through coupling capacitance (capacitive coupling) formed between the stylus pen 20 and the touch panel 200.

Here, the present invention is characterized in view of using a TX electrode (or a driving electrode) or an RX electrode (or a sensing electrode) of the touch panel, without a separate additional component, in order to transmit an electric signal through capacitive coupling between the stylus pen 20 and the signal receiving unit (or the controller). In addition, the stylus pen 20 of the present invention does not have a separate power supply unit for supplying an electric signal to the touch panel 200, but instead receives an electric signal from the touch panel 200 using an LC circuit and transfers an electric signal to the touch panel 200 using the LC circuit.

Figure 2A:
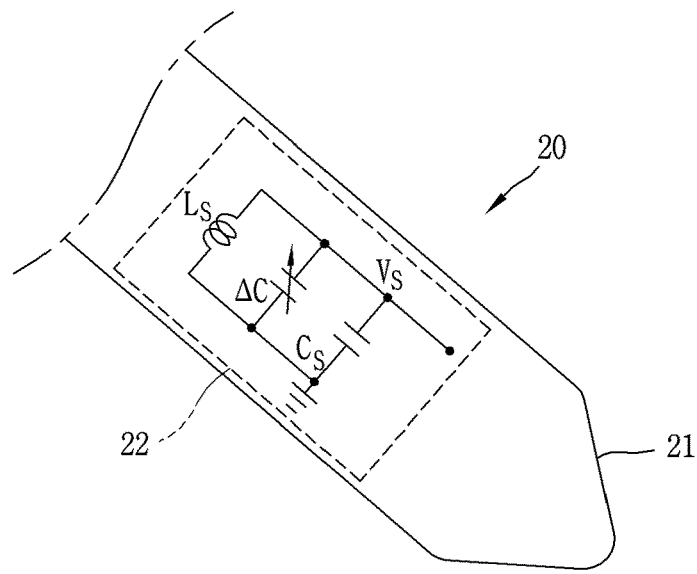
FIGS. 2A and 2B are conceptual views illustrating a stylus pen in accordance with one embodiment of the present invention.
Figure 2B:
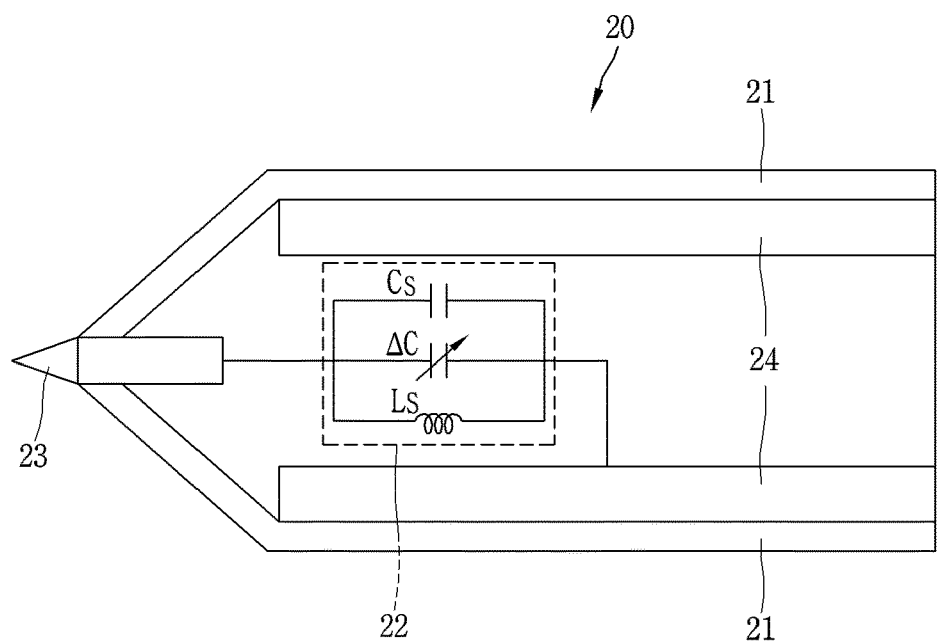

Also, the present invention relates to a method of detecting a location of the stylus pen (or a touched point (location, coordinates, etc.) of the stylus pen 20) using a received electric signal when the touch panel 200 receives the electric signal from the stylus pen 20 to through capacitive coupling. Hereinafter, a stylus pen according to one embodiment of the present invention will be described in detail with reference to the accompanying drawings. FIGS. 2A and 2B are conceptual views illustrating a stylus pen according to one embodiment of the present invention.

First, referring to FIG. 2A, a stylus pen 20 according to an embodiment of the present invention may include an LC circuit 22 (or an LC resonant circuit) provided with a coil L element Ls and capacitor C elements ΔC and CS, without using an element such as a transistor or a diode, which consumes power. Here, the LC circuit 22 may include a variable capacitor ΔC whose capacitance changes according to a force pressing the stylus pen 20. Since the LC circuit 22 basically does not consume power, a separate power source for driving the circuit within the stylus pen 20 may not be provided.

In order to start a resonance operation of the LC circuit 22 of the stylus pen 20, it is necessary to apply a start signal of the resonance operation. To apply such a start signal is to give an initial condition of resonance, specifically, to receive an electric signal (or electric energy) from an outside (i.e., from the touch panel 200).

A mutual capacitance CM may be formed between the stylus pen 20 and the touch panel 200 through capacitive coupling. That is, the stylus pen 20 and the touch panel 200 of the present invention do not use inductive coupling, but may transmit an electric signal through the mutual capacitance CM formed between the touch panel 200 and the stylus pen 20 by the capacitive coupling (i.e., capacitance CM by capacitive coupling).

A magnitude of the mutual capacitance CM formed between the stylus pen 20 and the touch panel 200 increases as a distance between the stylus pen 20 and the touch panel 200 is shortened, and also increases as an available area between the touch panel 200 and the touch panel 200 increases.

To this end, an AC voltage is applied to the touch panel 200. The stylus pen 20 receives an electric signal (electric energy) corresponding to the AC voltage from the touch panel 200, to which the AC voltage is applied, through capacitive coupling. Resonance is generated in the LC circuit 22 provided in the stylus pen 20 by the electric signal transmitted from the touch panel 200.

More specifically, when a frequency of the AC voltage and an LC resonance frequency are different from each other, the LC circuit 22 of the stylus pen 20 generates oscillation in a mixed form of oscillation with an LC resonance frequency component and oscillation with an AC power frequency component.

Since the LC resonance itself does not involve power consumption, even if the AC power supply is stopped, the LC circuit 22 continuously maintains the LC resonance. In practice, however, resistance components exist in a wiring and an inductor L constituting the LC circuit 22, and oscillation energy is released (consumed) as thermal energy due to the resistance. Therefore, an amplitude of the LC resonance is gradually attenuated as time elapses. At this time, even if the AC voltage is continuously supplied, the attenuation of the LC resonance continues, and eventually the oscillation of the LC resonance frequency component becomes zero. However, the oscillation with the AC power frequency component continuously exists without being attenuated while the AC power is continuously supplied.

When the supply of the AC voltage to the touch panel 200 is stopped, the LC resonance circuit which has been oscillated at the frequency of the AC voltage immediately stops the oscillation at the AC power frequency and starts the oscillation at the LC resonance frequency. On the other hand, the LC resonance frequency may be defined by a coil capacitance of an L element provided in the LC circuit 22 and a capacitance of a C element. Here, the LC circuit 22 includes a fixed capacitance Cs and a variable capacitance ΔC.

The variable capacitance ΔC may be changed, for example, by applying an external force to the stylus pen 20. Here, applying the external force to the stylus pen 20 may correspond to a case where the touch panel 200 is touched (or pressed) by a user using the stylus pen 20 or a case where pressure is applied to a button for changing the variable capacitance ΔC provided in the stylus pen 20.

When the variable capacitance ΔC included in the LC circuit 22 is changed by an external force, the LC resonance frequency of the LC circuit 22 may be changed. Accordingly, the LC resonance frequency of the electric signal output from the stylus pen 20 is changed, and the controller may detect pressure of the stylus pen 20, which has applied a touch to the touch panel 200, by using the changed LC resonance frequency detected on the touch panel 200 20.

For example, the capacitance ΔC of the variable capacitor has a different value based on touch pressure (or pressure) applied to the touch panel 200 by the stylus pen 20. As a result, the LC resonance frequency also has a different value. That is, a first electric signal sent from the stylus pen 20 to the touch panel before a touch is applied is converted into a second electric signal having a frequency different from an LC resonance frequency included in the first electric signal, and pressure is detected based on the second electric signal.

A principle of detecting pressure in the present invention may be understood as detecting a frequency of a resonance signal (accurately, a frequency of a changed resonance signal) generated by the LC resonance circuit embedded in the stylus pen. When the supply of the AC voltage to the touch panel 200 is stopped, the touch panel 200 receives an electric signal having the LC resonance frequency from the stylus pen 20. More specifically, when the supply of the electric signal corresponding to the AC voltage from the touch panel 200 is stopped, the stylus pen 20 transmits an electric signal resonated in the LC circuit 22 to the touch panel 200 through the capacitive coupling.

The controller may detect a location of the stylus pen 20 (or a point at which the stylus pen 20 touches the touch panel 200) based on the electric signal received by the touch panel 200. A detailed method of detecting the location of the stylus pen 20 will be described later with reference to the accompanying drawings.

Hereinafter, the stylus pen 20 according to one embodiment of the present invention will be described in more detail with reference to FIG. 2B. The stylus pen 20 according to one embodiment of the present invention may be configured to perform transmission and reception of an electric signal with the touch panel 200 using capacitive coupling. The stylus pen 20 for realizing the capacitive coupling with the touch panel may include a main body 21, and a pen tip 23 made of a conductor and protruding to outside of the main body 21 to apply a touch to the touch panel 200. The stylus pen 20 may also include an LC circuit 22 disposed in the main body 21 and provided with an inductor Ls and capacitors Cs and ΔC.

The LC circuit 22 may be electrically connected to the pen tip 23 to generate the capacitive coupling with the touch panel 200. A more detailed description of the electric connection between the LC circuit 22 and the pen tip 23 will be described later. Hereinafter, a detailed description of each component will first be described in more detail.

The main body 21 serves as a case that defines appearance of the stylus pen 20. A space may be formed in the main body 21 and the components, such as the LC circuit 22 and the conductive member 24, constituting the stylus pen 20 may be disposed in the space. The main body 21 may be formed of various materials. For example, the main body 21 may be formed by injecting synthetic resin into a mold or may be formed of a metal, for example, stainless steel (STS), aluminum (Al), titanium (Ti), or the like.

Since the main body 21 defines the appearance of the stylus pen 20, any substance may be used as long as it is a material having a reference strength that can maintain the appearance at a certain level. Specifically, the main body 21 may be made of a conductive material or a nonconductive material. However, the main body 21 may preferably be formed of the nonconductive material in order to prevent a flow of an electric signal caused due to an object (for example, a user's hand) which uses the stylus pen 20. When an electric signal is generated by the object using the stylus pen 20, an electric signal transmitted/received through the capacitive coupling between the touch panel 200 and the stylus pen 20 is changed and thereby an electric signal used for deciding a touched point becomes unstable.

Meanwhile, the stylus pen 20 of the present invention may include the pen tip 23 protruding to the outside of the main body 100 to touch the touch panel. The pen tip 23 may be formed of a conductor. Specifically, the entire pen tip 23 or only a portion forming a surface of the pen tip 23 may be formed of a conductive material.

Also, the pen tip 23 may be electrically connected to the LC circuit 22. Here, the electric connection may refer to that the pen tip 23 formed of the conductor and the LC circuit 22 are connected to each other through an object (for example, a power line, a wiring) through which an electric signals are directly transmitted and received. According to the present invention, by forming the pen tip 23 using the conductor, and electrically connecting the pen tip 23 and the LC circuit 22 to each other, a magnitude of an electric signal which is transmitted and received through the capacitive coupling between the touch panel 200 and the stylus pen 20 can increase.

In detail, the capacitive coupling may be formed between a touch panel electrode of the touch panel 200 and a capacitor (C element) constituting the LC circuit 22 of the stylus pen 20. That is, the capacitive coupling may be formed as a stray capacitance CP existing in the touch panel electrode and the capacitors Cs and ΔC included in the LC circuit 22 are adjacent to each other. In response to the formation of the capacitive coupling, a mutual capacitance CM may be generated (formed) between the touch panel 200 and the stylus pen 20.

The electric signal transmitted and received between the touch panel 200 and the stylus pen 20 may be related to the mutual capacitance CM. That is, as the mutual capacitance CM increases, a magnitude of the transmitted/received electric signal increases.

Here, the increase in the magnitude of the electric signal should be understood as a meaning including an increase in the magnitude of the electric signal itself, an increase in a transmission/reception ratio of the electric signal, an increase in an amount of electric signals increases, and the like. The capacitor of the LC circuit 22 has an effect of being located on the pen tip 22 due to the electric connection between the pen tip 23 and the LC circuit 22. Furthermore, a distance between the touch panel electrode of the touch panel 200 and the capacitor of the stylus pen 20 is more shortened than that before the LC circuit 22 is electrically connected to the conductive pen tip 23.

Here, the mutual capacitance CM increases as the two objects (the touch panel electrode and the pen tip) forming the mutual capacitance become closer to each other due to the characteristics of the capacitor. Accordingly, a magnitude of an electric signal transmitted/received between the touch panel 200 and the stylus pen 20 increases as the LC circuit 22 is electrically connected to the pen tip 22 formed of the conductor.

The stylus pen 20 receives an electric signal transmitted from the touch panel 200 through the pen tip 23 formed of the conductor and transmits the received electric signal to the LC circuit 22 electrically connected to the pen tip 23. That is, the LC circuit 22 may be resonated by the electric signal supplied from the pen tip 23. Accordingly, the LC circuit 22 may enter a resonance state faster by receiving the electric signal through the pen tip 23, as compared with when transmitting and receiving the electric signal directly with the touch panel electrode.

The stylus pen 20 may also transmit an electric signal generated in the LC circuit 22 to the touch panel 200. The electric signal generated in the LC circuit 22 may be transmitted to the touch panel 200, using the capacitive coupling, through the conductive pen tip 23 electrically connected to the LC circuit 22.

Similar to the aforementioned, as the electric signal generated in the LC circuit 22 is transmitted to the touch panel 200 through the pen tip 23 formed of the conductor, the magnitude of the electric signal received by the touch panel 200 can increase. Meanwhile, the pen tip 23 may have various shapes. For example, when the pen tip 23 is formed in a shape of a cone having one bottom surface and one vertex and the vertex of the cone-like pen tip 23 is directed to the outside of the main body 21, the magnitude of the electric signal transmitted and received between the pen tip 23 and the touch panel 200 may increase as the pen tip 23 is tilted.

In detail, when the cone-like pen tip 23 is tilted, the mutual capacitance generated by the capacitive coupling is increased in view of the characteristics of the capacitor which is proportional to an area and inversely proportional to a distance. Therefore, the magnitude of the electric signal transmitted/received between the stylus pen 20 and the touch panel 200 increases in proportion to a tilted degree of the pen tip 23.

As another example, when the pen tip 23 is formed in a hemispheric shape and a bottom surface of the hemispheric pen tip 23 is disposed to be brought into contact with the main body, the magnitude of the electric signal transmitted/received between the pen tip 23 and the touch panel 200 may be constantly maintained even though the stylus pen 20 is tilted. In this case, even if the stylus pen is tilted, stability of the electric signal transmitted and received between the touch panel 200 and the stylus pen 20 can be improved.

The stylus pen of the present invention may further include a conductive member 24 provided in the main body and electrically connected to the LC circuit to increase a magnitude of an electric signal. The conductive member 24, as illustrated in FIG. 2B, may be provided within the main body 21 and electrically connected to the LC circuit 22. Here, the electric connection may refer to that the conductive member 24 and the LC circuit 22, similar to the electric connection between the LC circuit 22 and the pen tip 23, are connected to each other through an object (for example, a power line) through which the electric signal is directly transmitted and received.

As illustrated in FIG. 2B, in the present invention, a magnitude of an electric signal transmitted and received between the touch panel and the stylus pen 20 may increase by electrically connecting the LC circuit 22 and the conductive member 24 to each other. The conductive member 24 may be understood to serve as a virtual ground GND.

Figure 3:
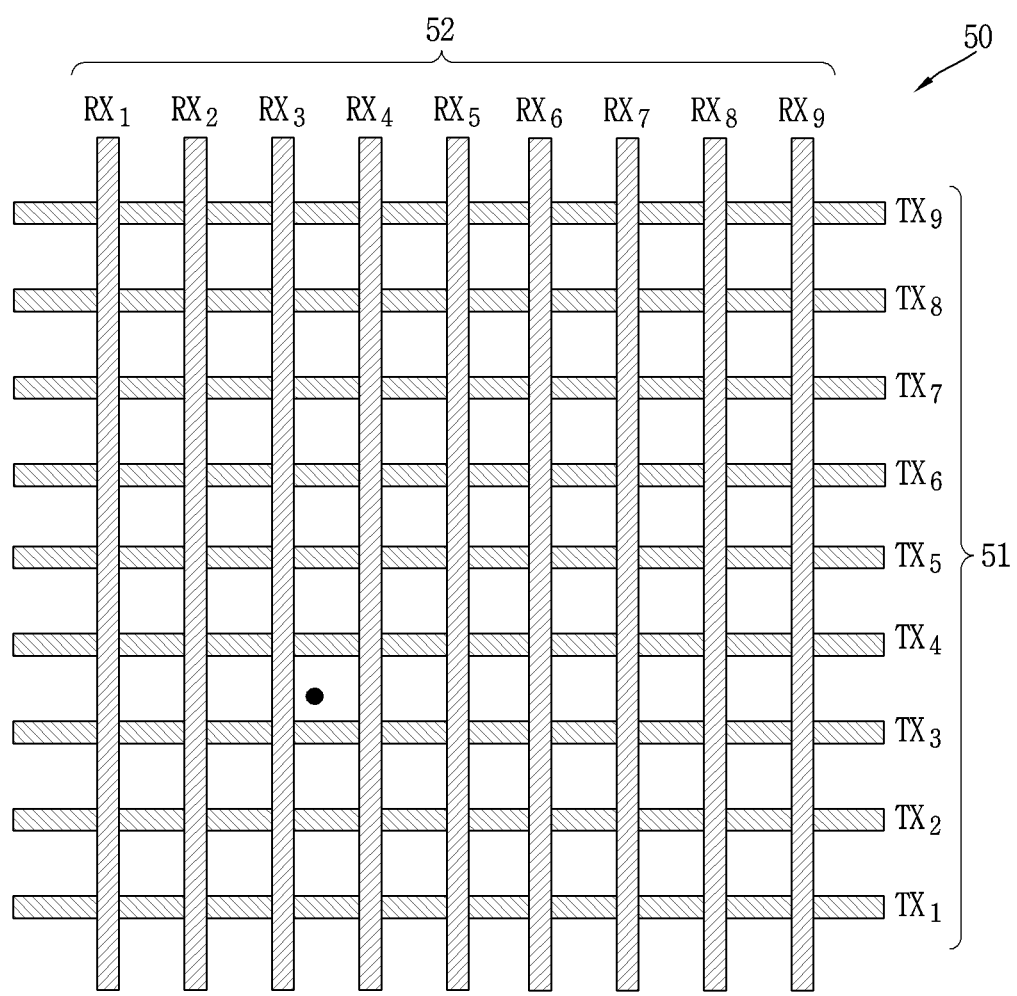
FIG. 3 is a conceptual view illustrating a touch panel electrode provided in a touch panel in accordance with one embodiment of the present invention.
Figure 4:
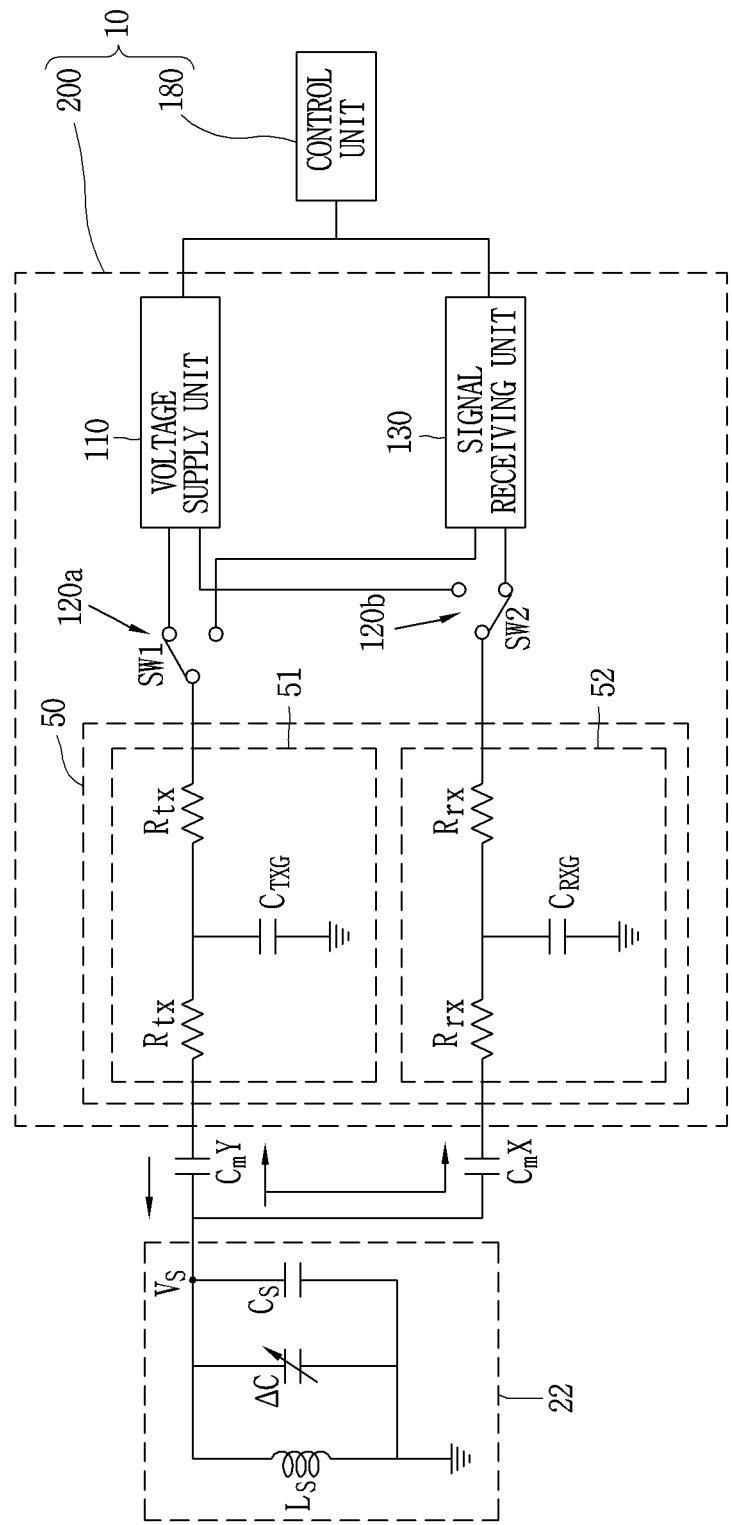
FIG. 4 is a circuitry view illustrating a method of transmitting and receiving an electric signal between a stylus pen and a touch panel through capacitive coupling in accordance with one embodiment of the present invention.

Hereinafter, the touch panel for transmitting and receiving an electric signal with the stylus pen described with reference to FIGS. 2A and 2B will be described in detail with reference to the accompanying drawings. FIG. 3 is a conceptual view illustrating a touch panel electrode included in a touch panel according to one exemplary embodiment of the present invention. FIG. 4 is a circuitry view illustrating a method of transmitting and receiving an electric signal through capacitive coupling between a stylus pen and a touch panel according to one exemplary embodiment of the present invention.

The touch panel 200 according to one exemplary embodiment of the present invention may include a plurality of touch panel electrodes 50, a voltage supply unit 110, switches 120a and 120b, and a signal receiving unit 130. When an electric signal(s) is supplied from the stylus pen 20 to the touch panel electrode 50, the signal receiving unit 130 (or a touch controller) may receive the signal(s) received in the touch panel electrode 50, process the signal(s), and then transmit corresponding data to the controller. Here, the signal receiving unit 130 may be a separate component from the controller 180, and the controller 180 itself.

First, referring to FIG. 3, the touch panel electrode 50 of the touch panel 200 may include a plurality of TX electrodes (lines) 51 and a plurality of RX electrodes (lines) 52. Here, the TX electrode 51 may be referred to as a driving electrode (line), and the RX electrode 52 may be referred to as a sensing electrode (line).

A plurality of TX electrodes 51 and a plurality of RX electrodes 52 may be arranged in a grid or matrix form. More specifically, the plurality of TX electrodes 51 may be arranged at predetermined intervals in a first direction (for example, a Y-axis direction), and the plurality of RX electrodes 52 may intersect with the plurality of TX electrodes 51 to be arranged at predetermined intervals in a second direction different from the first direction (for example, an X-axis direction). Here, the first direction and the second direction may be perpendicular to each other.

Referring to FIG. 4, the touch panel 200 of the present invention may include a voltage supply unit 110 for applying a voltage to the touch panel electrode 50, a signal receiving unit 130 for processing an electric signal received (detected) by the touch panel electrode 50, a switch unit 120 (120a and 120b) for selectively connecting the TX electrode 51 and the RX electrode 52 included in the touch panel electrode 50 to the voltage supply unit 110 and the signal receiving unit 130, 120b, and the like.

At least one of the voltage supply unit 110, the switch unit 120 and the signal receiving unit 130 may be provided within the touch panel 200 or may be provided outside the touch panel 200. When such components are provided outside the touch panel 200, the touch panel 200 may refer to the touch panel electrode 50.

The controller 180 may control the components(s) included in the touch panel 200. For example, the controller 180 may control the voltage supply unit 110 and the switches 120a and 120b to supply a voltage to at least one of the TX electrode 51 and the RX electrode 52.

The controller 180 may also control the signal receiving unit 130 and the switches 120a and 120b to sense an electric signal received from the stylus pen 20 through at least one of the TX electrode 51 and the RX electrode 52 after a lapse of a predetermined time. According to this configuration, the present invention can connect the voltage supply unit 110 to the RX electrode 52 as well as the TX electrode 51, and also connect the signal receiving unit 110 for processing the electric signal received from the stylus pen 20 110 even to the TX electrode 51 as well as the RX electrode 52.

The voltage supply unit 110 may supply a voltage even to the RX electrode 52 as well as the TX electrode 51, and the signal receiving unit 130 may process even an electric signal received from the TX electrode 41 as well as an electric signal received from the RX electrode 52.

Hereinafter, a process of performing transmission and reception of an electric signal between the touch panel 200 and the stylus pen 20 through the capacitive coupling will be described in more detail with reference to FIG. 4. FIG. 4 illustrates a circuit configuration on the stylus pen side and a circuit configuration on the touch panel side where the capacitive coupling is formed.

The stylus pen may be provided with an LC circuit 22 for storing an electric signal(s) (electric power, electric energy) transmitted by capacitive coupling. The LC circuit 22 may transmit the stored electric signal to the touch panel 200. Briefly showing the circuit on the touch panel side, the TX electrode 51 may include resistance components R_tx of the TX electrode and a stray capacitance C_TXG of the TX electrode. Also, the RX electrode 51 may include resistance components R_rx of the RX electrode and a stray capacitance C_RXG of the RX electrode.

The stray capacitance C_TXG, C_RXG may be referred to as a parasitic capacitance and affected by a line width of an electrode line. For example, the stray capacitance may increase as the line width increases. Also, the resistance components of the TX electrode and the RX electrode may be reduced as the line width of the electrode line becomes larger.

On the other hand, a mutual capacitance may be formed between the touch panel electrode 50 and the stylus pen 20 by the capacitive coupling. In detail, a first mutual capacitance C_mY may be formed between the LC circuit 22 of the stylus pen and the TX electrode 51 of the touch panel electrode 50, and a second mutual capacitance C_mX different from the first mutual capacitance may be formed between the LC circuit 22 of the stylus pen and the touch panel electrode 50.

As illustrated in FIG. 4, when an AC voltage is applied to the TX electrode 51 from the voltage supply unit 110, the LC circuit 22 of the stylus pen 20 may receive electric energy (electric signal) from the Tx electrode 51 through the first mutual capacitance C_mY formed by the capacitive coupling. The LC circuit 22 which has received the electric energy may start resonance and generate an electric signal. The electric signal within the LC circuit 22 may be a signal obtained by combining a component oscillating at a frequency equal to a frequency f_AC of the AC voltage (or a signal of the voltage supply unit (AC power source)) and a component oscillating at a resonance frequency f_LC of the LC circuit 22.

At this time, a voltage V_S, which is the electric signal of the LC circuit 22 of the stylus pen 20, may be defined as shown in Equation (1).

Equation 1

$$V_S(t) = C_{mY}(A_1 \sin(2\pi f_{AC}t + \varphi_1) - A_2 e^{-A_3 t} \sin(2\pi f_{LC}t + \varphi_2))$$ [Equation 1]

Here, $A_1$, $A_2$ and $A_3$ denote proportional constants, which are decided by a function of electric parameters $L_S$, $C_S$, $\Delta C$ of a coil and capacitors constituting the LC circuit 22, a ratio ($f_{LC}/f_{AC}$) of the frequency of the AC voltage and the LC resonance frequency, and the like. All of these are constant even as time goes.

A first term on a left side of Equation 1 is a signal that oscillates as the LC circuit 22 of the stylus pen receives electric energy (or an AC power supply signal) from the TX electrode to which the AC voltage is applied, and a second term on a right side thereof is an LC resonance signal of the LC circuit 22 of the stylus pen.

exp (−A_3*t) of the second term expresses that the signal of the second term attenuates as time elapses, and only the signal which oscillates in response to the reception of the AC power supply signal of the first term is left. The equation of the second term may be understood as an operation in a general LC resonance circuit.

Here, the LC resonance signal is attenuated because oscillation energy is consumed as thermal energy by the resistance components existing in the LC circuit 22. On the other hand, when a preset time t_a elapses, the controller 180 may control a switch SW1 to stop the supply of the AC voltage to the TX electrode. The preset time t_a refers to a time at which a supply of electric energy from the TX electrode to the LC circuit 22 of the stylus pen 20 is judged to exceed a reference amount or may be decided by a user setting or a control of the controller.

When the supply of the AC voltage to the TX electrode 51 is cut off (at t=t_a), the signal oscillates as the LC circuit 22 of the stylus pen receives the electric energy (or the AC power supply signal) from the TX electrode, to which the AC voltage is applied, disappears due to the cut-off supply. Also, the LC circuit 22 of the stylus pen generates an electric signal oscillating at the resonance frequency $f_{LC}$, which may be expressed by the following Equation 2.

Equation 2

$$V_S(t)|_{t=t_a} = -C_{mY} A_2 e^{-A_3(t-t_a)} \sin(2\pi f_{LC}(t-t_a) + \varphi_2)$$ [Equation 2]

The stylus pen 20 may supply the electric signal generated in the LC circuit 22 to the touch panel 200. The RX electrode 52 may detect (receive) the electric signal supplied from the stylus pen 20 through the mutual capacitance $C_mX$ formed by the capacitive coupling.

The electric signal detected by the RX electrode 52 is transferred to the signal receiving unit 130, which may be expressed by Equation 3.

Equation 3

$$V_{RX}(t)]_{TX} = \frac{C_{mX}}{C_{RXG}} V_S(t) \bigg|_{t \geq t_a} = -\frac{C_{mX}C_{mY}}{C_{RXG}} A_2 e^{-A_3(t-t_a)} \sin(2\pi f_{LC}(t-t_a) + \varphi_2) \quad \text{[Equation 3]}$$

Here, $V_{RX}]_{TX}$ denotes an electric signal that is transmitted from the stylus pen 20 to the RX electrode 52 after electric energy is transferred to the stylus pen 20 by the TX electrode 51.

The signal receiving unit 130 receiving the electric signal as shown in Equation 3 may detect at least one of a location and touch pressure of the stylus pen based on a magnitude of the electric signal, a frequency component included in the electric signal and a phase of the electric signal. The foregoing description may be applied in the same/like manner to a case where the AC voltage is supplied to the RX electrode 52 or a case of receiving an electric signal from the TX electrode 51.

The mobile terminal 10 according to one embodiment of the present invention, which may include at least one of the aforementioned components, may supply electric energy to the stylus pen 20 through the capacitive coupling, and detect the location of the stylus pen 20 based on the electric signal received from the stylus pen 20.

Figure 5:
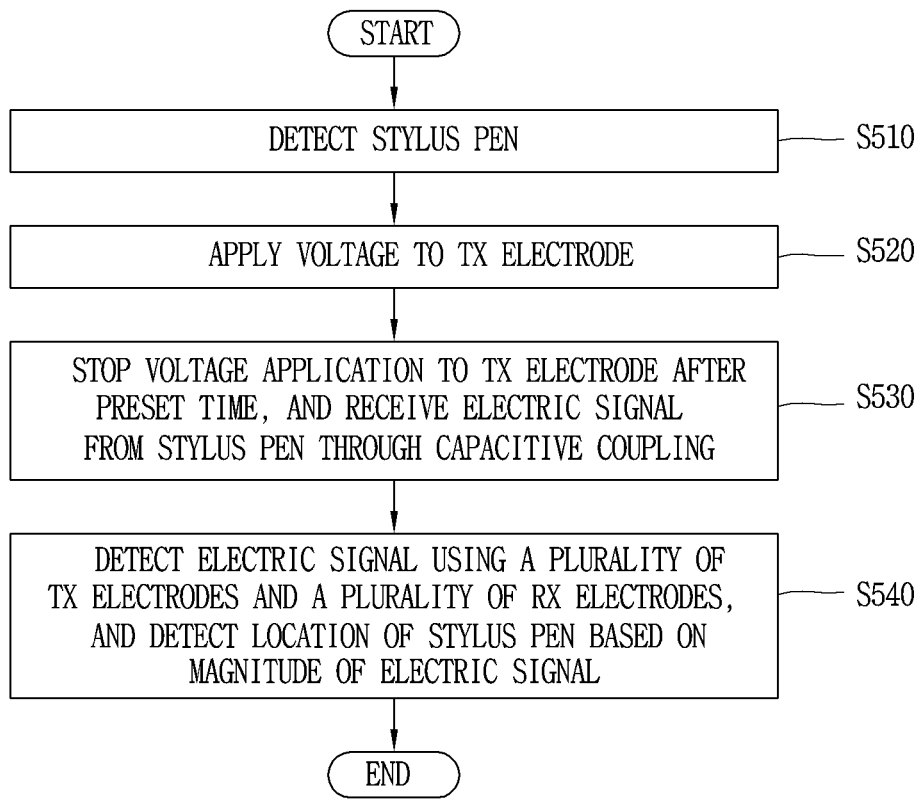
FIG. 5 is a flowchart illustrating a control method of detecting a location of a stylus pen in accordance with one embodiment of the present invention.
Figure 6:
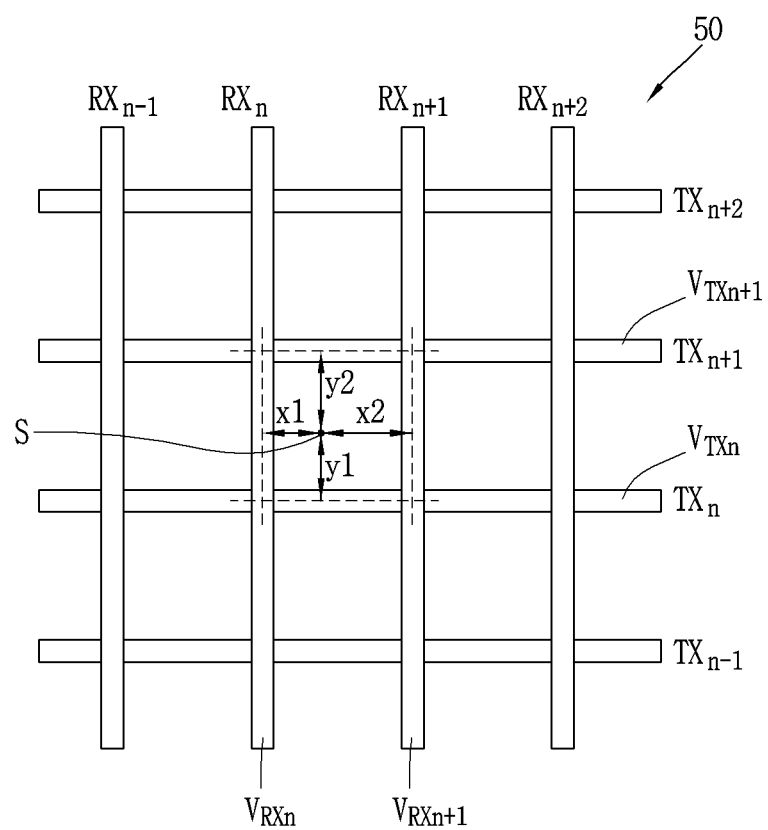
FIG. 6 is a conceptual view illustrating the control method illustrated in FIG. 5.

Hereinafter, a method of detecting the location of the stylus pen 20 in the present invention will be described in detail with reference to the accompanying drawings. FIG. 5 is a flowchart illustrating a control method of detecting a location of a stylus pen according to one exemplary embodiment of the present invention. FIG. 6 is a conceptual view illustrating the control method illustrated in FIG. 5.

The mobile terminal 10 of the present invention detects the stylus pen 20 (S510). The detection of the stylus pen 20 may correspond to determining whether the stylus pen 20 has applied a touch (or an input) to the touch panel 200 or whether the stylus pen 20 is within a preset distance from the touch panel 200.

The controller 180 may determine whether the stylus pen 20 has touched the touch panel 200 based on at least one of a capacitance change and pressure applied to the touch panel 200. The controller 180 may also detect the touch of the stylus pen 20 through scanning of the plurality of TX electrodes 51 and the plurality of RX electrodes 52 constituting the touch panel electrode 50.

The controller 180 may determine whether the stylus pen 20 is present within a preset distance from the touch panel 200 based on the change in the capacitance of the touch panel 20 due to the electric signal received from the stylus pen 20. The preset distance may refer to a distance at which the capacitance is changed by a reference value or more due to the electric signal transmitted from the stylus pen 20.

That is, in the present invention, since the capacitive coupling is generated between the stylus pen 20 and the touch panel 200, and an electric signal is transmitted and received between the stylus pen 20 and the touch panel 200 through the capacitive coupling, the controller 180 may detect the presence of the stylus pen 20 even if the touch is not applied. The mobile terminal 10 according to the present invention may determine whether the stylus pen 20 is present within the preset distance from the touch panel 200, namely, whether the stylus pen 20 is located adjacent to the touch panel 200, using a touch panel, a proximity sensor, a light sensor, a motion sensor, a camera and the like.

When the stylus pen 20 is detected, the mobile terminal 10 of the present invention applies a voltage to the touch panel electrode 50 (S520). In detail, the controller 180 may control the voltage supply unit 110 to apply the AC voltage to the plurality of TX electrodes 51 included in the touch panel electrode 50, in response to the detection of the stylus pen.

At this time, in the present invention, a voltage may be simultaneously applied to all of the plurality of TX electrodes 51. This is different from applying a voltage to the plurality of TX electrodes 51 one by one in the related art capacitive touch method. The stylus pen 20 may receive an electric signal (electric energy) from the TX electrode through capacitive coupling. At this time, as the AC voltage is supplied to all of the plurality of TX electrodes 51, the stylus pen 20 can receive the electric signal more quickly.

Here, the controller 180 may control the switch 120b such that the AC voltage is also applied to the RX electrode 52 as well as the TX electrode 51. In this case, similarly, the controller 180 may apply the voltage to the plurality of RX electrodes 51 simultaneously, other than one by one. Afterwards, in the present invention, after a preset time elapses, the voltage is not applied to the TX electrode any more and an electric signal is received from the stylus pen through the capacitive coupling (S530).

Here, the preset time may refer to a time at which it is determined that an amount of electric energy supplied from the touch panel electrode 50 (or the TX electrode 51) to the LC circuit 22 of the stylus pen 20 is equal to or larger than a reference amount, and may be decided by a user setting or a control of the controller.

The controller 180 may stop the supply of the electric energy to the touch panel electrode 50 after a lapse of the preset time. The controller 180 may connect all of the touch panel electrode 50 provided in the touch panel 200 to the signal receiving unit 130 (or the controller 180).

For example, when the voltage supply unit 110 is connected to the plurality of TX electrodes 51 and the signal receiving unit 130 is connected to the plurality of RX electrodes 52, the plurality of TX electrodes 51 connected to the voltage supply unit 110 may be connected to the signal receiving unit 130, in response to the lapse of the preset time. This may indicate that the TX electrode is switched from a driving mode to a sensing mode.

Thereafter, in the present invention, an electric signal is detected using the plurality of TX electrodes and the plurality of electrodes, and a location of the stylus pen is detected based on a magnitude of the detected electric signal (S540). When the electric signal is received from the stylus pen 20 through the capacitive coupling, the controller 180 may detect the location of the stylus pen 20 based on signal magnitudes of at least two touch panel electrodes by which the electric signal is detected.

Here, the at least two touch panel electrodes where the electric signal is detected may be the TX electrode 51 and the RX electrode 52. That is, the controller 180 may receive the electric signal from the stylus pen 20 through the TX electrode 51 as well as the RX electrode 52. The location of the stylus pen 20 may indicate a point where the stylus pen 20 applies a touch to the touch panel 200. The point may correspond to a coordinate value.

When the stylus pen 20 is located within a preset distance from the touch panel 200 without touching the touch panel 200 (i.e., located at a proximity point), the location of the stylus pen 20 may refer to an intersection point when an orthogonal projection is made from one point of the stylus pen 20 to the touch panel 200. One point of the stylus pen 20, for example, may be an end portion of the pen tip of the stylus pen 20 or a point of the pen tip of the stylus pen 20 which is the closest to the touch panel 200.

The controller 180 may detect the location of the stylus pen 20 based on at least one of a signal magnitude of a TX electrode, by which the electric signal has been detected (received), among the plurality of TX electrodes 51, and a signal magnitude of an RX electrode, by which the electric signal has been detected (received), among the plurality of RX electrodes 51.

The controller 180 may decide first and second TX electrodes of the plurality of TX electrodes 51 and first and second RX electrodes of the plurality of RX electrodes 52 based on the signal magnitudes of the electric signals detected by the plurality of TX electrodes 51 and the plurality of RX electrodes 52.

In detail, when the electric signal is received from the stylus pen 20 through the capacitive coupling, the controller 180 may determine the signal magnitude of the electric signal received from each of the plurality of TX electrodes 51 and the plurality of RX electrodes 52. Afterwards, the controller 180 may decide a TX electrode having the largest electric signal among the plurality of TX electrodes 51 and another TX electrode having the next largest electric signal as the first and second TX electrodes, respectively. Likewise, the controller 180 may decide an RX electrode having the largest electric signal among the plurality of RX electrodes 52 and another RX electrode having the next largest electric signal as the first and second RX electrodes, respectively.

The first and second TX electrodes may be two TX electrodes adjacent to a point, at which the stylus pen is located, among the plurality of TX electrodes, and the first and second RX electrodes may be two RX electrodes adjacent to the point, at which the stylus pen is located, among the plurality of RX electrodes.

This is because the magnitude of the electric signal received by the touch panel electrode 50 is proportional to a magnitude of the mutual capacitance formed through the capacitive coupling between the stylus pen 20 and the touch panel electrode 50. That is, since the magnitude of the mutual capacitance increases as the distance between the stylus pen 20 and the touch panel electrode 50 is short, the first and second TX electrodes and the first and second RX electrodes may be two TX electrodes and two RX electrodes, which are adjacent to the located point of the stylus pen, among the plurality of RX electrodes 51 and the plurality of RX electrodes 52. The controller 180 may detect the location of the stylus pen using signal magnitudes of the first and second TX electrodes and signal magnitudes of the first and second RX electrodes.

Referring to FIG. 6, when the stylus pen is located at a point S surrounded by TXn, TXn+1, RXn and RXn+1, the controller 180 may decide the first and second TX electrodes TXn and TXn+1 and the first and second RX electrodes RXn and RXn+1 on the basis of the signal magnitudes of the electric signals received by the plurality of TX electrodes 51 and the plurality of RX electrodes 52.

Then, the controller 180 may decide the position S of the stylus pen on the basis of signal magnitudes $V_{TXn}$ and $V_{TXn+1}$ of the electric signals received by the first and second TX electrodes and signal magnitudes $V_{RXn}$ and $V_{RXn+1}$ of the electric signals received by the first and second RX electrodes.

The controller 180, as expressed in Equation 4, may calculate a ratio of x1 and x2 and a ratio of y1 and y2, based on a ratio of the signal magnitudes $V_{TXn}$ and $V_{TXn+1}$ of the electric signals received by the first and second TX electrodes and a ratio of the signal magnitudes $V_{TXn}$ and $V_{TXn+1}$ of the electric signals received by the first and second RX electrodes.

Equation 4

$$\frac{V_{TX_n}}{V_{TX_{n+1}}} = \frac{y2}{y1}, \frac{V_{RX_n}}{V_{RX_{n+1}}} = \frac{x2}{x1} \qquad \text{[Equation 4]}$$

The signal magnitude of the electric signal received by the touch panel electrode 50 is inversely proportional to the distance between the touch panel electrode 50 and the stylus pen 20. This is because the signal magnitude of the electric signal is proportional to the magnitude of the mutual capacitance between the stylus pen 20 and the touch panel electrode 50 and the magnitude of the mutual capacitance is inversely proportional to the distance.

Since values of x1+x2 and y1+y2 are physical values, the controller 180 may calculate values of x1, x2, y1 and y2 using the values of x1+x2 and y1+y2, and the ratio of x1 and x2 and the ratio of y1 and y2, which have been calculated through Equation 4, and thus detect the location S of the stylus pen 20 using the calculated values of x1, x2, y1 and y2.

For example, the location S of the stylus pen 20 may be on coordinates (xn+x1, yn+y1) when it is assumed that coordinates of an intersection between the RXn electrode and the TXn electrode are (xn, yn). On the other hand, the controller 180 may decide whether the stylus pen 20 is located on one of the plurality of TX electrodes or one of the plurality of RX electrodes, on the basis of the signal magnitudes of the electric signals received by the plurality of TX electrodes 51 and the plurality of RX electrodes 52.

For example, when the stylus pen 20 is located on one of the TX electrodes, a signal magnitude of an electric signal detected by the one TX electrode is the largest, and signal magnitudes of electric signals detected by two TX electrodes adjacent to the one TX electrode may be the same or less than a reference magnitude. In this case, the controller 180 may determine that the stylus pen 20 is located on the one TX electrode. This may equally be applied to a case where the stylus pen 20 is located on any one of the RX electrodes.

According to this configuration, a speed of supplying electric energy to the stylus pen 20 can be improved by applying a voltage simultaneously to at least one of the plurality of TX electrodes 51 and the plurality of RX electrodes 52. The present invention may also receive the electric signals from the stylus pen 20 simultaneously through the plurality of TX electrodes 51 and the plurality of RX electrodes 52, and detect the location of the stylus pen 20 quickly and accurately based on the signal magnitudes of the received electric signals.

Meanwhile, according to the present invention, when electric energy is supplied to the stylus pen through the TX electrode and an electric signal is received from the stylus pen through the RX electrode, the location of the stylus pen may be detected based on the electric signal received through the RX electrode.

Hereinafter, a method of detecting the location of the stylus pen based on the electric signal received through the RX electrode and a method of improving speed and accuracy of detecting the location of the stylus pen will be described in more detail with reference to the accompanying drawings.

Figure 7:
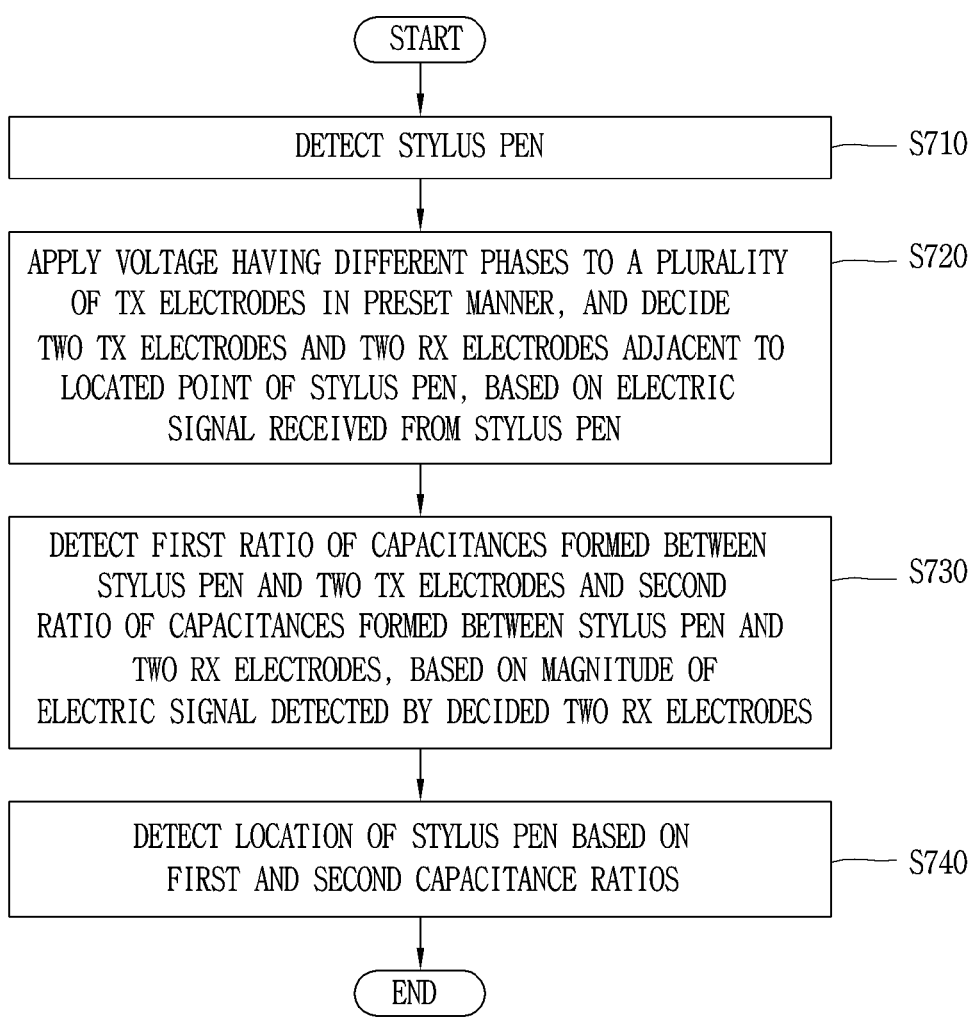
FIG. 7 is a flowchart illustrating a control method of detecting a location of a stylus pen in accordance with another embodiment of the present invention.
Figure 8:
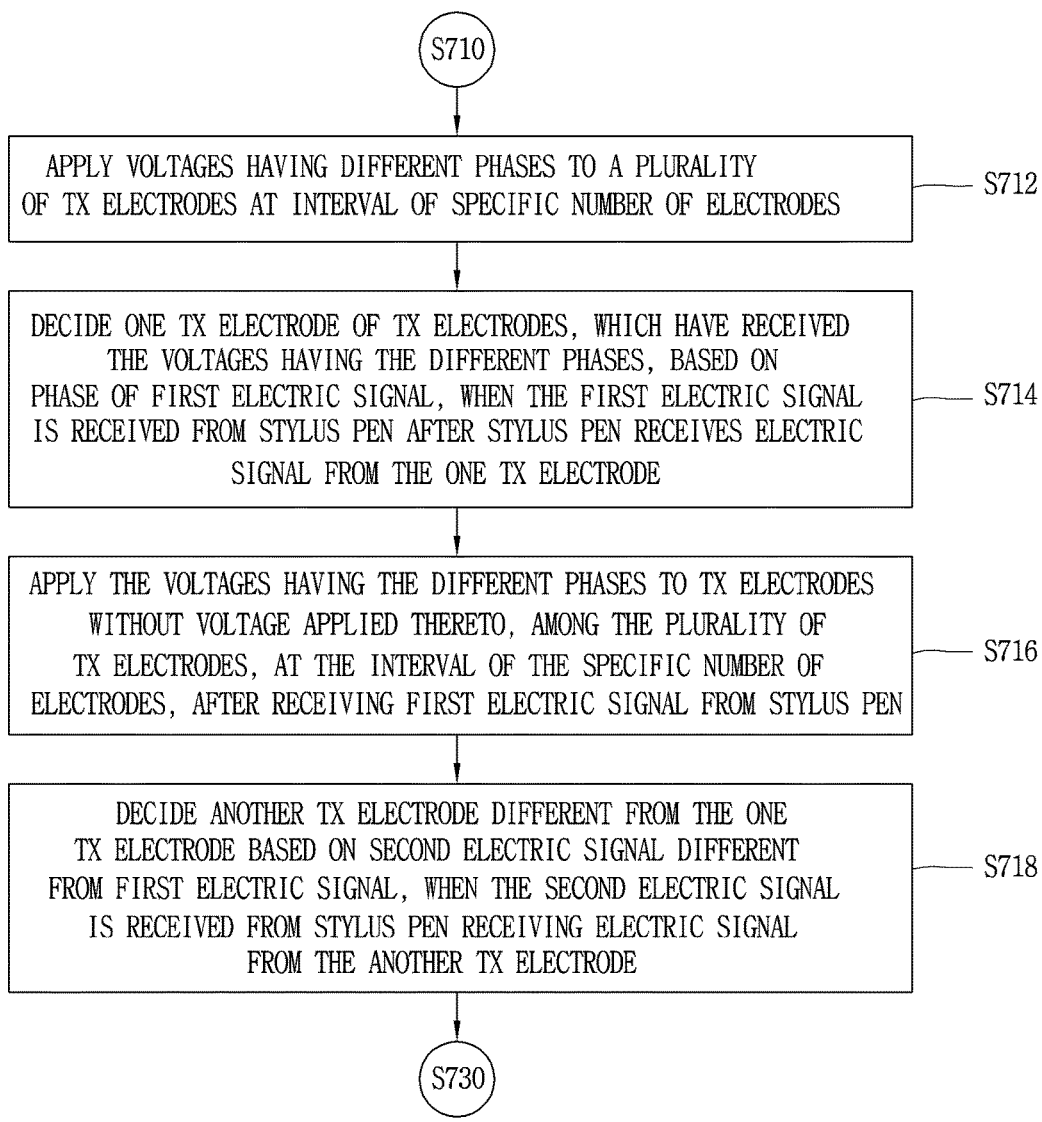
FIG. 8 is a flowchart illustrating in detail a control method of deciding two TX electrodes and two RX electrodes adjacent to a point where the stylus pen is located in the control method illustrated in FIG. 7.
Figure 9:
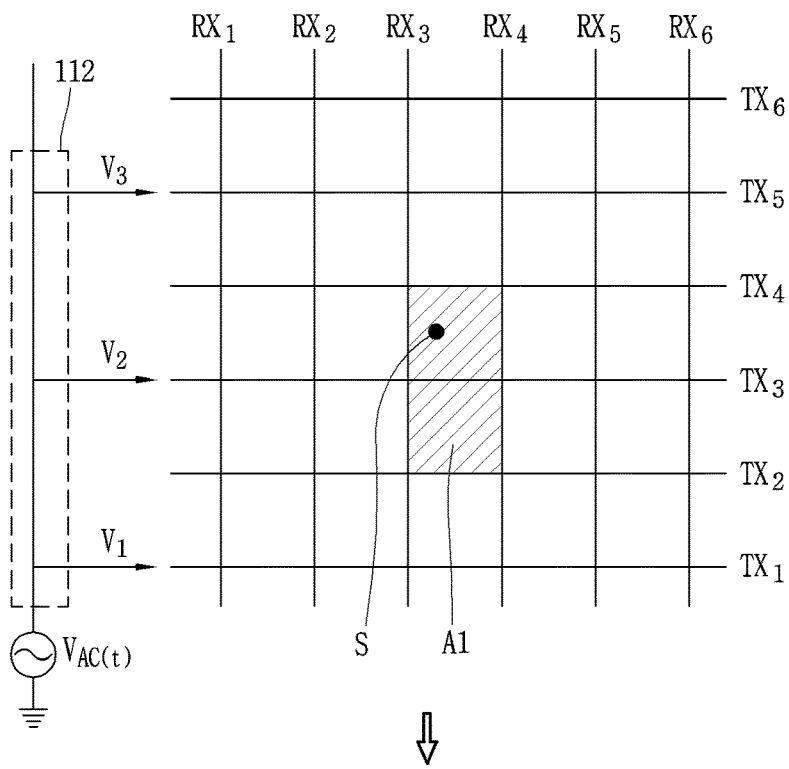
FIGS. 9 and 10 are conceptual views illustrating the control method illustrated in FIG. 8.
Figure 9:
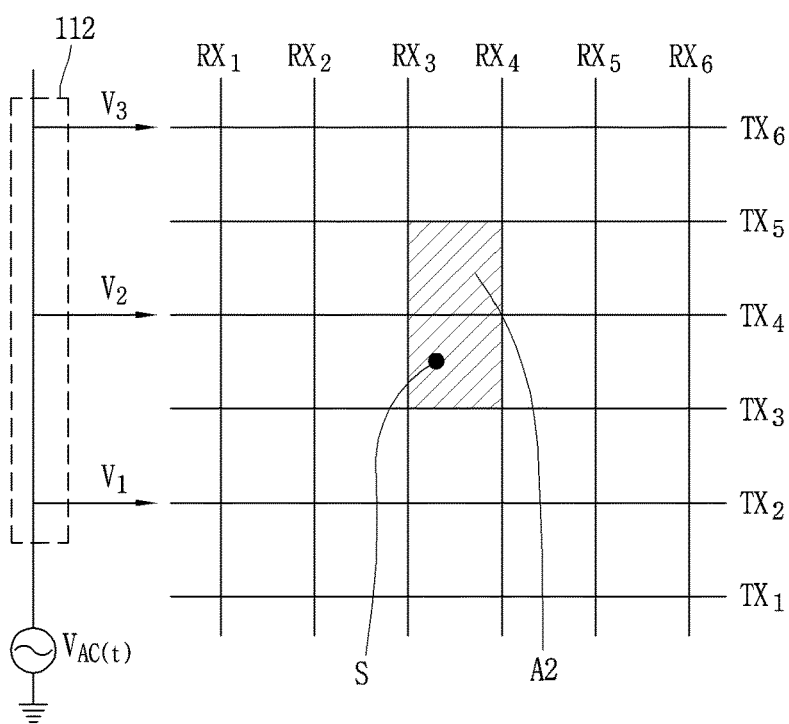
Figure 10:
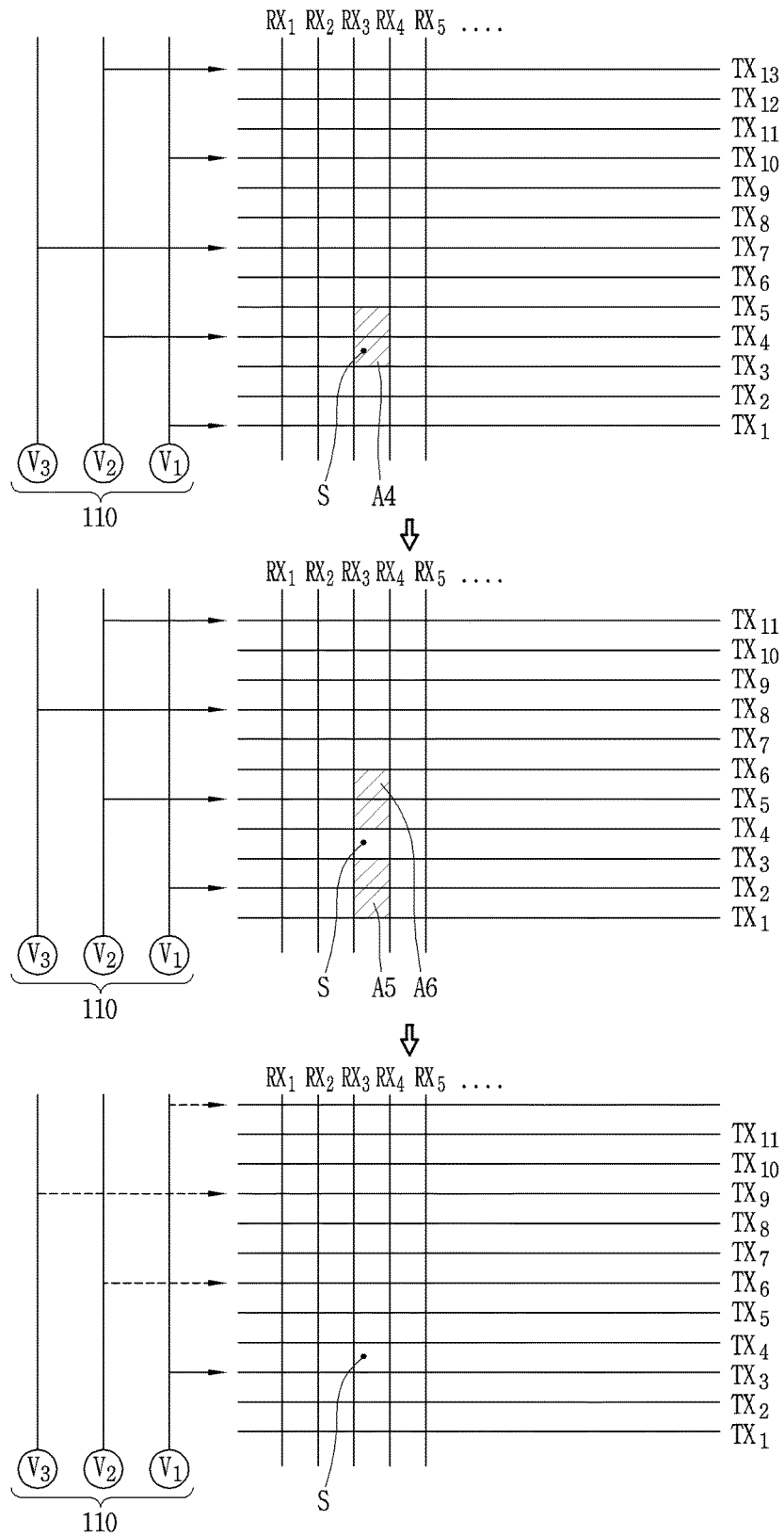

FIG. 7 is a flowchart illustrating a control method of detecting a location of a stylus pen according to another embodiment of the present invention. FIG. 8 is a flowchart illustrating a control method of deciding two TX electrodes and two RX electrodes adjacent to a point where the stylus pen is located in the control method illustrated in FIG. 7. FIGS. 9 and 10 are conceptual views illustrating the control method illustrated in FIG. 8.

Figure 11:
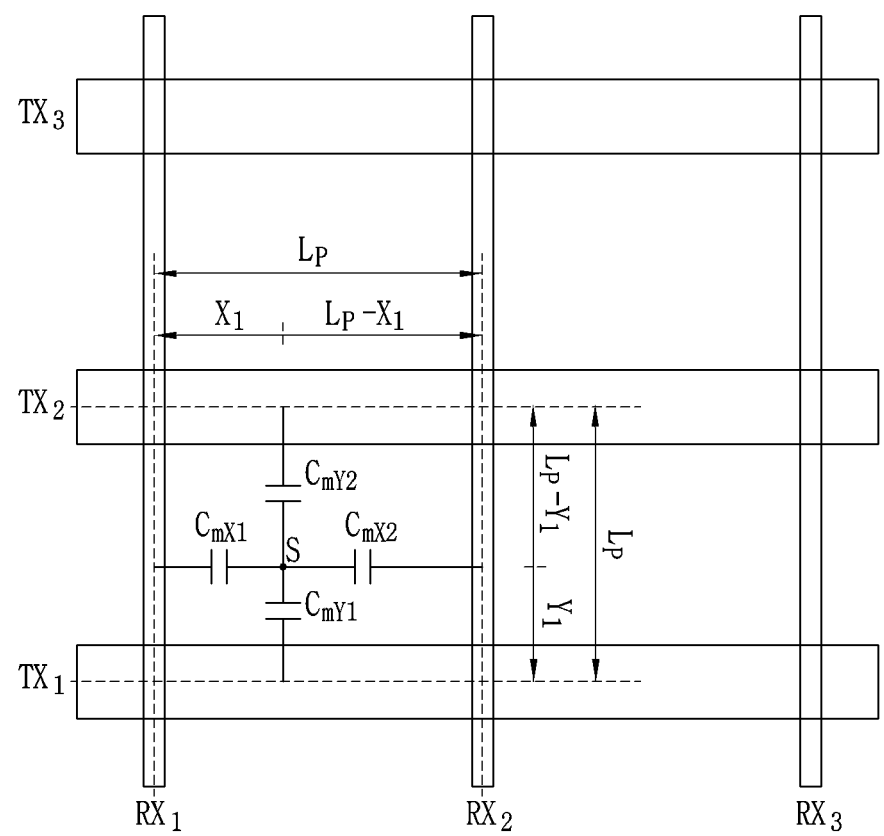
FIG. 11 is a conceptual view illustrating a method of detecting a location of a stylus pen using a ratio of capacitance formed between a stylus pen and a touch panel electrode in accordance with one embodiment of the present invention.

FIG. 11 is a conceptual view illustrating a method of detecting the location of the stylus pen using a ratio of capacitances formed between the stylus pen and the touch panel electrode according to one embodiment of the present invention. The mobile terminal 10 according to the present invention may apply voltages having different phases to at least some of the plurality of TX electrodes 51, and decide two TX electrodes and two RX electrodes adjacent to the stylus pen 20 based on phases of electric signals received from the stylus pen 20 through the plurality of RX electrodes 52.

The mobile terminal 10 of the present invention may detect the location of the stylus pen 20 using ratios of capacitances formed between the stylus pen 20 and two TX electrode and capacitances formed between the stylus pen 20 and two RX electrodes, on the basis of electric signals received through the RX electrode 52.

Hereinafter, a flowchart for detecting the location of the stylus pen 20 according to another embodiment will be first described with reference FIG. 7. Referring to FIG. 7, in the present invention, the stylus pen 20 is detected (S710). The same/like description given in the previous step S510 will be applied to the step S710.

Afterwards, in the present invention, voltages having different phases are applied to the plurality of TX electrodes in a preset manner, and two TX electrodes and two RX electrodes adjacent to a point where the stylus pen 20 is located are decided based on an electric signal received from the stylus pen (S720). A method of applying voltages having different phases to a plurality of TX electrodes in a preset manner and a method of determining two TX electrodes and two RX electrodes adjacent to a point where the stylus pen 20 is located will be described later with reference to FIGS. 8 to 10.

Afterwards, in the present invention, a first ratio of capacitances formed between the stylus pen and the two TX electrodes and a second ratio of capacitances formed between the stylus pen and the two RX electrodes are detected, based on signal magnitudes of electric signals detected by the decided two RX electrodes (S730). Thereafter, in the present invention, a location of the stylus pen 20 is detected based on the first and second ratios of capacitances (S740). Detailed description of the steps S730 and S740 will be given later with reference to FIG. 11, after describing the method of deciding two TX electrodes and two RX electrodes adjacent to the point where the stylus pen 20 is located.

Hereinafter, description will be given in detail of a method of applying voltages having different phases to a plurality of TX electrodes in a preset manner and a method of deciding two TX electrodes and two RX electrodes adjacent to a point where the stylus pen 20 is located (S720), with reference to FIGS. 8 to 10.

Hereinafter, it is assumed that electric signals are transmitted and received between two TX electrodes and two RX electrodes adjacent to the stylus pen 20. For example, when the stylus pen 20 is located with being surrounded by TXn, TXn+1, RXn, and RXn+1, the stylus pen 20 performs transmission and reception of electric signals with the electrodes TXn, TXn+1, RXn, RXn+1. This is because magnitudes of electric signals may be negligibly small, which results from that distances between the stylus pen 20 and TX electrodes below TXn−1, TX electrodes over TXn+2, RX electrodes below RXn−1 and RX electrodes over RXn+2 are longer than the distances between the stylus pen 20 and TXn, TXn+1, RXn and RX+1.

Referring to FIG. 8, in the present invention, voltages having different phases may be applied to the touch panel 200, and a location of the stylus pen 20 may be detected based on a phase of an electric signal received from the stylus pen 20. To this end, the controller 180 may control the power supply unit 110 to apply voltages having different phases to the plurality of TX electrodes 51 included in the touch panel 200 in a preset manner. This is to detect TX electrodes adjacent to the point where the stylus pen 20 is located based on electric signals detected by the RX electrodes 52. Here, the RX electrodes adjacent to the point where the stylus pen 20 is located may be decided based on magnitudes of the electric signals detected by the plurality of RX electrodes 52.

The controller 180 may apply voltages having different phases to at least some of the plurality of TX electrodes, and may not apply a voltage to any TX electrode, except for the at least some of the plurality of TX electrodes. In detail, the controller 180 may apply voltages having different phases to the plurality of TX electrodes 51 so as to have an interval of a specific number of electrodes (S712).

Applying the voltages to the plurality of TX electrodes 51 at the interval of the specific number of electrodes may refer to that a voltage is not applied to at least one TX electrode based on one TX electrode to which the voltage is applied. For example, as illustrated in a top of FIG. 9, when the specific number is 1, the controller 180 may apply different voltages to TX1, TX3, TX5, . . . . At this time, the different voltages may be simultaneously applied to the TX1, TX3, TX5, . . . .

The specific number may be at least one or more. The reason why the voltages having the different phases are not applied to two adjacent TX electrodes is that the two adjacent TX electrodes mutually affect each other to change a phase of electric energy supplied to the stylus pen 20 or reduce a magnitude of the electric energy supplied to the battery 20. When a voltage having a first phase among the voltages having the different phases is applied to one of the plurality of TX electrodes, the controller 180 may apply a voltage having a second phase different from the first phase to a TX electrode, which is located after at least one TX electrode based on the TX electrode to which the voltage having the first phase is applied.

For example, as illustrated in the top of FIG. 9, when a voltage V1 having a first phase is applied to one of the plurality of TX electrodes TX1, a voltage V2 having a second phase different from the first phase may be applied to the TX electrode TX3 disposed after at least one TX electrode based on the TX electrode TX1 to which the voltage V1 having the first phase is applied.

The power supply unit 110 may further include a phase shifter 112 for shifting a phase. The controller 180 may control the phase shifter 112 to generate a voltage having a different phase with respect to a voltage V_AC of the power supply unit. Although not illustrated, the power supply unit 110 may include a plurality of AC power sources for generating voltages having different phases.

When a first electric signal is received from the stylus pen 20 after the stylus pen 20 receives an electric signal from one of the TX electrodes to which the voltages having different phases are applied, the controller 180 may decide the one TX electrode based on a phase of the received first electric signal (S714). For example, as illustrated in the top of FIG. 9, when the stylus pen S is located surrounded by TX3, TX4, RX3 and RX4, the stylus pen S may receive an electric signal from one of TX electrodes TX1, TX3 and TX5 to which voltages V1, V2, and V3 having different phases are applied.

Afterwards, the controller 180 may stop applying the voltages to the TX electrodes after a preset time (for example, t_a) elapses, and detect a plurality of RX electrodes using the first electric signal received from the stylus pen S through capacitive coupling. For example, as illustrated in the top of FIG. 9, when a voltage V1 applied to TX1 has a first phase and a voltage V2 applied to TX3 has a second phase different from the first phase, the first electric signal received from the stylus pen S may have the second phase. This is because the voltage applied to the TX electrode TX2, supplied to the stylus pen S, is the voltage having the second phase. Here, the first electric signal may have the same phase as the second phase, or may have a phase difference within a reference range.

The controller 180 may decide two RX electrodes RX3 and RX4 adjacent to the stylus pen S based on a signal magnitude of the first electric signal received by the plurality of RX electrodes 52. The controller 180 may decide one of the plurality of TX electrodes 51 based on the phase of the first electric signal received by the plurality of RX electrodes 52.

The controller 180 may decide two RX electrodes RX3 and RX4 based on the signal magnitude of the first electric signal and decide one TX electrode TX3 based on the phase of the first electric signal. That is, the controller 180 may determine that a point S at which the stylus pen is located is included in an area A1.

The series of processes described in steps S712 and S714 may be referred to as a 'first detection period'. After the first electric signal is received from the stylus pen 20, the controller 180 may apply the voltages having the different phases to TX electrodes of the plurality of TX electrodes, to which no voltage is applied, at an interval of a specific number of electrodes (S716).

For example, as illustrated in a bottom of FIG. 9, the controller 180 may apply voltages V1, V2, and V3 having different phases to TX electrodes TX2, TX4, TX6, to which any voltage has not been applied, among the plurality of TX electrodes, at an interval of a specific number of electrodes. Accordingly, the stylus pen 20 may receive electric energy from the TX electrode TX4, different from the TX electrode TX3 from which the electric energy has been supplied in the first detection period.

Afterwards, the controller 180 may stop applying the voltages to the TX electrodes based on a lapse of a preset time (for example, t_a), and detect a second electric signal received from the stylus pen S through the capacitive coupling by using the plurality of RX electrodes. When the second electric signal different from the first electric signal is received from the stylus pen, which has received the electric signal from another TX electrode TX4 different from the one TX electrode, the controller 180 may decide the another TX electrode based on the received second electric signal (S718).

For example, as illustrated in the bottom of FIG. 9, when a voltage V1 applied to TX2 has a first phase and a voltage V2 applied to TX4 has a second phase different from the first phase, the second electric signal received from the stylus pen S may have the second phase. This is because the voltage applied to the TX electrode TX2, supplied to the stylus pen S, is the voltage having the second phase. Here, the second electric signal may have the same phase as the second phase, or may have a phase difference within a reference range.

The controller 180 may decide the another TX electrode TX4 among the plurality of TX electrodes 51 based on the phase of the second electric signal received by the plurality of RX electrodes 52. In this case, the controller 180 may determine that the stylus pen S is present within an area A2. The steps S716 and S718 may be referred to as a 'second detection period'.

Thereafter, the controller 180 may detect two TX electrodes adjacent to the stylus pen S based on the detection results in the first and second detection periods (i.e., the one TX electrode detected in the first detection period and the another TX electrode detected in the second detection period).

A number of detection periods for deciding two TX electrodes adjacent to the stylus pen S based on the phase of the electric signal detected by the RX electrodes may depend on a number of TX electrodes to which a voltage is not applied. For example, when the number of TX electrodes to which no voltage is applied is one (TX1, TX3, TX5, . . . ), the controller 180 may detect two TX electrodes adjacent to the stylus pen through two detection periods. As another example, when the number of TX electrodes to which no voltage is applied is two (TX1, TX4, TX7, . . . ), the controller may decide two TX electrodes adjacent to the stylus pen S through a maximum of three detection periods.

Meanwhile, in the present invention, voltages having different phases may be applied to a plurality of TX electrodes in various ways. The controller 180 may apply voltages having different phases to the plurality of TX electrodes at at least two-electrode intervals. This is to minimize a mutual influence between the TX electrodes that supply electric energy to the stylus pen 20.

For example, when voltages having different phases are applied to the plurality of TX electrodes at an one-electrode interval (TX1, TX3) and the stylus pen 20 is located on a TX electrode TX2 without a voltage applied thereto, electric energy supplied to the stylus pen 20 is mutually affected by TX1 and TX3, and a phase thereof may be changed.

In addition, the controller 180 may sequentially apply a preset number of voltages having different phases to the plurality of TX electrodes 51 to have predetermined intervals. At this time, as illustrated in FIG. 10, the power supply unit 110 may include the preset number of AC power sources. The AC power sources of the power supply unit 110 may generate voltages having different phases. Also, as described above, in the present invention, the power supply unit 110 may be provided with the phase shifter for generating a preset number of different voltages.

The predetermined interval may be decided based on the number of AC power sources supplying voltages having different phases. The predetermined interval may be one less than the number of the AC power sources. For example, when there are two AC power sources for supplying voltages having different phases, voltages having different phases may be sequentially applied to the plurality of TX electrodes 51 at a one-electrode interval.

As another example, as illustrated in FIG. 10, when there are three AC power sources for supplying voltages V1, V2 and V3 having different phases, the voltages having the different phases may be sequentially applied to the plurality of TX electrodes 51 at a two-electrode interval.

Here, applying voltages having different phases to the plurality of TX electrodes to have a predetermined interval may indicate that the voltages having the different phases are alternately applied to the TX electrodes to have the predetermined interval. For example, when the number of voltages having different phases is three (V1, V2, V3), a predetermined interval at which no voltage is applied may be two TX electrodes. At this time, when V1 is applied to TX1, power is not applied to TX2 and TX3, and V2 may be applied to TX4. V3 may also be applied to TX7, other than TX5 and TX6. At the same time, V1 is applied to TX10 again, and V2 is applied to TX13 again.

That is, when the number of voltages having different phases is decided as a preset number, the voltages having the different phases may be simultaneously applied to the plurality of TX electrodes alternately at a preset interval.

Hereinafter, description will be given of a method of deciding two TX electrodes adjacent to the stylus pen through a maximum of three detection periods, when the number of voltages having different phases is three, with reference to FIG. 10. As illustrated in a top of FIG. 10, in a first detection period, the controller 180 may simultaneously apply three voltages V1, V2, and V3 having different phases to a plurality of TX electrodes alternately at a two-electrode interval (TX1-V1, TX4-V2, TX7-V3, TX10-V1, TX13-V2, . . . ).

When the stylus pen S is located surrounded by TX3, TX4, RX3, and RX4, the stylus pen S may receive electric energy by V2 applied to TX2. When receiving the electric signal from the stylus pen S, the controller 180 may determine that the stylus pen is located in an area A4 based on a phase included in the received electric signal. That is, the controller 180 may decide TX4 based on the fact that the phase of the received electric signal is equal to the phase of V2 at the TX4 electrode. In other words, the phase of V2 at the TX4 electrode and the phase of V2 at a TX13 electrode may differ from each other depending on lengths of wires along which the voltage is applied.

The controller 180 may receive the electric signal through the plurality of RX electrodes 52. The controller 180 may decide two RX electrodes RX3 and RX4 adjacent to the stylus pen based on a magnitude of the electric signal. Afterwards, as illustrated in a middle of FIG. 10, in a second detection cycle, the controller 180 may simultaneously apply voltages having different phases to TX electrodes, to which no voltage is applied, among the plurality of TX voltages alternately at a two-electrode interval (TX2-V1, TX5-V2, TX8-V3, TX11-V1, . . . ).

In this case, since the stylus pen S is far from TX2 and TX5 to which different voltages are applied, the stylus pen S may not be supplied with electric energy. Thus, the RX electrode 52 fails to receive an electric signal from the stylus pen S. The controller 180 may determine that the stylus pen S exists between the TX3 and TX4 electrodes based on the failure of the detection of the electric signal in the second detection period.

Although two TX electrodes and two RX electrodes adjacent to the stylus pen 20 have been decided through the first and second periods, the controller 180 may apply a voltage to TX3 to decide a position (coordinates) of the stylus pen at a third detection period. This is to extract a ratio of capacitances formed between the stylus pen and the TX3 and TX4 electrodes (details thereof will be described in more detail below).

According to this configuration, the present invention can use voltages having different phases to decide two TX electrodes and two RX electrodes adjacent to a point where the stylus pen is located based on an electric signal detected by the RX electrodes.

Hereinafter, the steps S730 and S740 described in FIG. 7 will be described in detail with reference to FIG. 11. FIG. 11 is a conceptual view illustrating a method of detecting a location of a stylus pen using a ratio of capacitances formed between a stylus pen and a touch panel electrode according to one embodiment of the present invention.

The controller 180 may detect at least two ratios of capacitances formed between the touch panel 200 and the stylus pen 20 based on an electric signal received from the stylus pen 20, and detect a location of the stylus pen using the ratios of capacitances.

The capacitance refers to a mutual capacitance Cm formed by capacitive coupling. The at least two ratios of capacitances include a first ratio of capacitances formed between the stylus pen 20 and the TX electrodes 51 and a second ratio of capacitances formed between the stylus pen 20 and the RX electrodes 52.

In detail, when two TX electrodes and two RX electrodes adjacent to the stylus pen 20 are determined by the method described with reference to FIGS. 8 to 10, the controller 180 may detect the first ratio of capacitances formed between the stylus pen and the two TX electrodes and the second ratio of capacitances formed between the stylus pen and the two RX electrodes based on a magnitude of an electric signal detected by the decided two RX electrodes.

That is, the first ratio of capacitances is a ratio of two capacitances formed between the stylus pen 20 and the two TX electrodes adjacent to the stylus pen among the plurality of TX electrodes 51, and the second ratio of capacitances may be a ratio of two capacitances formed between the stylus pen 20 and the two RX electrodes adjacent to the stylus pen among the plurality of RX electrodes 52.

Here, the controller 180 may detect the first and second ratios of capacitances based on a magnitude of an electric signal detected by at least one of the two RX electrodes adjacent to the stylus pen 20. More specifically, the first ratio of capacitances formed between the stylus pen 20 and the two TX electrodes may be detected based on magnitudes of electric signals detected at different times by any one of the two RX electrodes. The second ratio of capacitances formed between the stylus pen 20 and the two RX electrodes may be detected based on signal magnitudes of the two RX electrodes.

Here, the electric signals detected at the different times may include a first electric signal which is received by one of the two RX electrodes from the stylus pen 20 after an electric signal is supplied to the stylus pen 20 from one of the two TX electrodes adjacent to the stylus pen 20, and a second electric signal which is detected by the one RX electrode after the electric signal is supplied from the one TX electrode and an electric signal is supplied to the stylus pen 20 from another TX electrode different from the one TX electrode.

The above description will be more clearly understood with reference to FIG. 11. Hereinafter, as illustrated in FIG. 11, description will be given of an example in which the stylus pen S is located surrounded by TX1, TX2, RX1, and RX2 electrodes. Hereinafter, for convenience of description, the terms RX1 and RX2 will be used other than an RX1 electrode and an RX2 electrode.

That is, it is assumed that two TX electrodes adjacent to the stylus pen 20 are TX1 and TX2 and two RX electrodes adjacent to the stylus pen 20 are RX1 and RX2, which are determined by the method described with reference to FIGS. 8 to 10. The following description will be applied in the same/like manner even when the stylus pen is present between other TX electrodes different from TX1 and TX2 and when the stylus pen is present between other RX electrodes different from RX1 and RX2.

It is also assumed that the stylus pen S receives electric energy supplied from the TX electrode and the controller 180 detects electric energy received from the stylus pen S through the RX electrode. A mutual capacitance (hereinafter, referred to as capacitance) C_m is formed between the stylus pen S and the TX electrode and the RX electrode by capacitive coupling. Here, the capacitance formed between the stylus pen S and a TXn electrode is expressed as C_mYn, and the capacitance formed between the stylus pen S and an RXn electrode is expressed as C_mYn (n is an integer).

Lp illustrated in FIG. 11 denotes a distance between RX electrodes RX1 and RX2 adjacent to each other and a distance between TX electrodes TX1 and TX2 adjacent to each other, X1 denotes a distance between the stylus pen S and the RX1 electrode, and Y1 denotes a distance between the stylus pen S and the TX1 electrode.

Capacitances C_mY1 and C_mY2 may be formed between the stylus pen S and TX1 and TX2, respectively, through the capacitive coupling, and capacitances C_mX1 and C_mX2 may be formed between the stylus pen S and RX1 and RX2, respectively. Since C_mY1 depends on the distance between the stylus pen S and TX1, the capacitance may have a function of C_mY1(Y1). Also, since C_mY2 depends on the distance between the stylus pen S and TX2, the capacitance may have a function of C_mY2(Lp−Y1).

Likewise, the capacitances formed between the stylus pen and RX1 and RX2 may also have functions of C_mX1(X1) and C_mX2(Lp−X1), respectively. The controller 180, as illustrated in FIGS. 8 to 10, may apply the AC voltage to TX1. The stylus pen 20 receives electric energy from TX1 through C_mY1. Afterwards, when a preset time (for example, t=ta) elapses, the controller 180 stops applying the AC voltage to TX1. When the application of the AC voltage is stopped, RX1 and RX2 detect an electric signal transmitted from the stylus pen 20. Specifically, RX1 receives the electric signal through C_mX1, and RX2 receives the electric signal via C_mX2.

Referring to the aforementioned Equation 2, V_RX1]TX1 (a signal transmitted from the stylus pen 20 to RX1 after the electric energy is transmitted from TX1 to the stylus pen 20) is expressed by Equation 5, as follows.

Equation 5

$$V_{RX1}(t)]_{TX1} = -\frac{C_{mX1}(x_1)C_{mY1}(y_1)}{C_{RXG}} A_2 e^{-A_3(t-t_a)} \sin(2\pi f_{LC}(t-t_a)+\varphi_2) \quad [\text{Equation 5}]$$

Similarly, V_RX2]TX1 (a signal transmitted from the stylus pen 20 to the RX2 after the electric energy is transmitted from TX1 to the stylus pen 20) (hereinafter, a description of a similar expression is omitted) may be expressed by Equation 6, as follows.

Equation 6

$$V_{RX2}(t)]_{TX1} = -\frac{C_{mX2}(L_p-x_1)C_{mY1}(y_1)}{C_{RXG}} A_2 e^{-A_3(t-t_a)} \sin(2\pi f_{LC}(t-t_a)+\varphi_2) \quad [\text{Equation 6}]$$

Also, the controller 180, as illustrated in FIGS. 8 to 10, may apply the AC voltage to the TX2. The stylus pen 20 receives electric energy from TX2 through C_mY2. Then, when a preset time (for example, t=ta) elapses, the controller 180 stops applying the AC voltage to TX2. When the application of the AC voltage is stopped, RX1 and RX2 detect an electric signal transmitted from the stylus pen 20. Specifically, RX1 receives the electric signal through C_mX1, and RX2 receives the electric signal through C_mX2.

In this case, V_RX1]TX2 may be expressed by Equation 7, and V_RX2]TX2 may be expressed by Equation 8.

Equation 7

$$V_{RX1}(t)]_{TX2} = -\frac{C_{mX1}(x_1)C_{mY2}(L_p-y_1)}{C_{RXG}} A_2 e^{-A_3(t-t_a)} \sin(2\pi f_{LC}(t-t_a)+\varphi_2) \quad [\text{Equation 7}]$$

Equation 8

$$V_{RX2}(t)]_{TX2} = -\frac{C_{mX2}(L_p-x_1)C_{mY2}(L_p-y_1)}{C_{RXG}} A_2 e^{-A_3(t-t_a)} \sin(2\pi f_{LC}(t-t_a)+\varphi_2) \quad [\text{Equation 8}]$$

Using Equations 5 to 8, Equations 9 and 10 may be derived.

Equation 9

$$\frac{V_{RX1}]_{TX1}}{V_{RX2}]_{TX1}} = \frac{C_{mX1}(x_1)}{C_{mX2}(L_p-x_1)} \quad [\text{Equation 9}]$$

Equation 10

$$\frac{V_{RX1}]_{TX1}}{V_{RX1}]_{TX2}} = \frac{C_{mY1}(y_1)}{C_{mY2}(L_p-y_1)} \quad [\text{Equation 10}]$$

As shown in Equations 9 and 10, it can be seen that the signal magnitude of the electric signal detected by the RX electrode is proportional to the magnitude of the mutual capacitance formed between the RX electrode and the stylus pen by the capacitive coupling. Equation 9 is a ratio of two capacitances C_mX1 and C_mX2 formed between the stylus pen 20 and two RX electrodes adjacent to the stylus pen 20, among the plurality of RX electrodes 52 (e.g., the second ratio of capacitances).

Equation 10 is a ratio of two capacitances C_mY1 and C_mY2 formed between the stylus pen 20 and two TX electrodes adjacent to the stylus pen 20, among the plurality of TX electrodes 51 (e.g., the first ratio of capacitance). The controller 180 may detect the first and second ratios of capacitances based on a signal magnitude detected by at least one of the two RX electrodes RX1 and RX2 adjacent to the stylus pen.

For example, referring to Equation 10, the first ratio of capacitances (C_mY1/C_mY2) may be detected based on signal magnitudes of electric signals V_RX1]TX1 and V_RX1]TX2 detected at different times by one (e.g., RX1)

of the two RX electrodes RX1 and RX2. The electric signals V_RX1]TX1 and V_RX1]TX2 detected at the different times may include a first electric signal V_RX1]TX1 received by the one RX electrode RX1 from the stylus pen after an electric signal is supplied to the stylus pen from one (e.g., TX1) of the two TX electrodes TX1 and TX2 adjacent to the stylus pen 20, and a second electric signal V_RX1]TX2 detected by the one RX electrode RX1 after the electric signal is supplied from the one TX electrode TX1 and an electric signal is applied from another TX electrode TX2 different from the one TX electrode TX1 to the stylus pen.

The controller 180 may calculate the first and second ratios of capacitances based on magnitudes of the signals V_RX1]TX1, V_RX2]TX1, V_RX1]TX2 and V_RX2]TX2, received from the two RX electrodes adjacent to the stylus pen 20. Since the Lp value is a physical value which is a value prestored in the mobile terminal, a ratio of y1 to Lp−y1 is inversely proportional to the first ratio of capacitances, and a ratio of x1 to Lp−x1 is inversely proportional to the second ratio of capacitance, the controller 180 may calculate x1 and y1 using this, and detect the location of the stylus pen 20 using the calculated x1 and y1.

In FIG. 7, the step S720 of deciding two TX electrodes and two RX electrodes adjacent to the stylus pen and the step S730 of detecting the first and second ratios of capacitances have been separately described, but the step S730 may be performed simultaneously with the step S720. In detail, as illustrated in the top of FIG. 9, when voltages having different phases are applied to the TX electrodes at an interval of a specific number of electrodes in the first detection period and then an electric signal is received from the stylus pen, the controller 180 may detect an electric signal V_RX3]TXn received by RX3 and an electric signal V_RX4]TXn received by RX4.

Afterwards, as illustrated in the bottom of FIG. 9, when voltages having different phases are applied to TX electrodes, to which no voltage is applied, of the plurality of TX electrodes at the interval of the specific number of electrodes and then an electric signal is received from the stylus pen, the controller 180 may detect an electric signal V_RX3]TXi received by the RX3 and an electric signal V_RX4]TXi received by the RX4.

When it is determined that TXn=TX3 and TXi=TX4 based on phases of the received electric signals, the controller 180 may detect the first and second ratios of capacitances using the signals V_RX3]TX3, V_RX4]TX3, V_RX3]TX4, V_RX4]TX4, and thus detect the location of the stylus pen. With this configuration, in the present invention, detection accuracy for the location of the stylus pen can be remarkably increased.

Hereinafter, a method of reducing noise of an electric signal transmitted from a stylus pen to an RX electrode according to the present invention will be described in detail with reference to the accompanying drawings.

Figure 12:
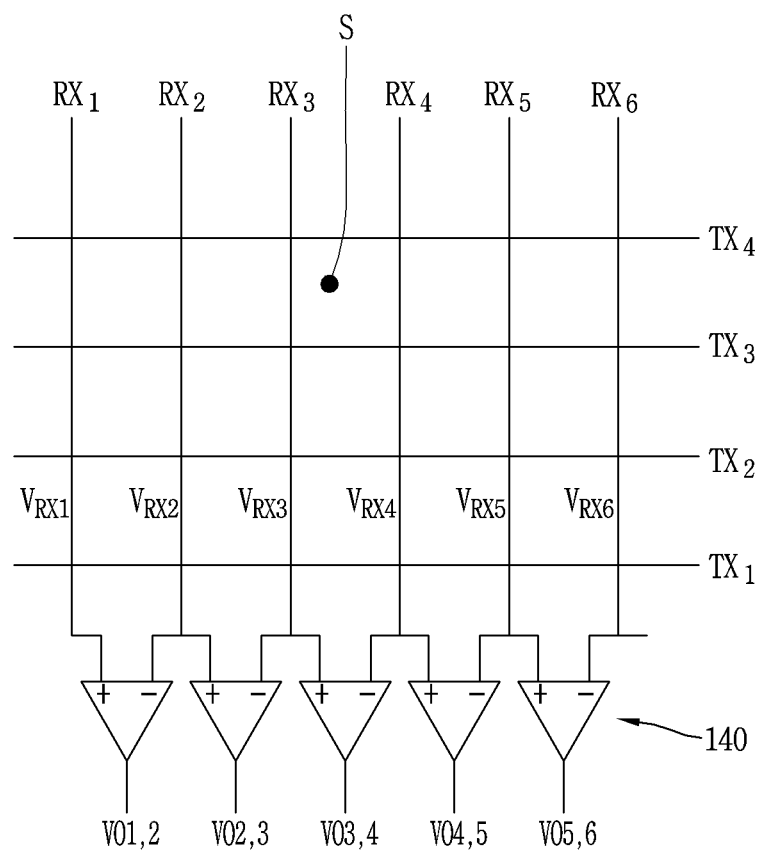
FIG. 12 is a conceptual view illustrating a method of detecting a location of a stylus pen based on a voltage output from a differential amplifier when the differential amplifier is provided in a touch panel in accordance with one embodiment of the present invention.

FIG. 12 is a conceptual view illustrating a method of detecting a location of a stylus pen based on a voltage output from a differential amplifier when the differential amplifier is provided in a touch panel according to one embodiment of the present invention. Referring to FIG. 12, the mobile terminal 10 of the present invention may further include a differential amplifier that is connected to a plurality of RX electrodes 52 in a preset manner, to remove noise included in electric signals detected by the plurality of RX electrodes 52.

The controller 180 may detect the first and second ratios of capacitances based on an output signal of the differential amplifier 140. Common noise is generated in the plurality of RX electrodes 52. In the present invention, the differential amplifier 140 may be provided in the touch panel 200 to remove the common noise.

The differential amplifier 140 may be connected to the plurality of RX electrodes 52 in the preset manner. Specifically, the differential amplifier 140 may be connected to RX electrodes, adjacent to each other, among the plurality of RX electrodes 52. For example, a first differential amplifier may be connected to RX1 and RX2, and a second differential amplifier may be connected to RX2 and RX3.

The output signal of the differential amplifier 140 (O_n, m) may be as shown in Equation 11.

Equation 11

$$VO_{n,m}]_{TXi} = V_{RXn}]_{TXi} - V_{RXm}]_{TXi} \qquad [\text{Equation 11}]$$

n, m, and i are integers.

Hereinafter, description will be given in detail of a method of calculating a ratio of two capacitances (the first ratio of capacitance) formed between the stylus pen and two TX electrodes, adjacent to the stylus pen, among the plurality of TX electrodes, and a ratio of two capacitances (the second ratio of capacitance) formed between the stylus pen and two RX electrodes, adjacent to the stylus pen, among the plurality of RX electrodes, on the basis of the output signal of the differential amplifier 140 connected to the RX electrodes 52.

In FIG. 12, it is assumed that the stylus pen is located surrounded by TX3, TX4, RX3, and RX4. The following description may be applied in the same/like manner even when the stylus pen is present between other TX electrodes different from TX3 and TX4 and when the stylus pen is present between other RX electrodes different from RX3 and RX4.

The controller 180 may apply the AC voltage to the TX3, as described in FIGS. 8 to 10. The stylus pen 20 receives electric energy from TX3 through C_mY3. Thereafter, when a preset time (for example, t=ta) elapses, the controller 180 stops applying the AC voltage to TX3. When the application of the AC voltage is stopped, RX3 and RX4 detect an electric signal transmitted from the stylus pen 20. In detail, RX3 receives the electric signal through C_mX3, and RX4 receives the electric signal through C_mX4.

Here, when the electric signal is detected by RX3, two differential amplifiers O_2,3 and O_3,4 connected to RX3 receive the electric signal from RX3 and output signals VO_2,3]TX3 and VO_3,4]TX3, respectively.

Similarly, when the electric signal is detected by RX4, two differential amplifiers O_3,4 and O_4,5 connected to RX4 receive the electric signal from RX4 and output signals VO_3,4]TX3 and VO_4,5]TX3, respectively. At this time, the controller 180 may detect the output signal of at least one of the differential amplifiers O_2,3, O_3,4 and O_4,5 connected to the RX3 and the RX4.

For example, the controller 180 may detect the output signals of the differential amplifiers O_2,3 and O_4,5, which are not adjacent to each other, among the differential amplifiers O_2, O_3, O_3, O_4, and O_5 connected to the RX3 and the RX4, and the output signals may be shown in Equations 12 and 13.

Equation 12

$$VO_{2,3}]_{TX3} = V_{RX2}]_{TX3} - V_{RX3}]_{TX3} = -V_{RX3}]_{TX3} \qquad [\text{Equation 12}]$$

Equation 13

$$VO_{4,5}]_{TX3} = V_{RX4}]_{TX3} - V_{RX5}]_{TX3} = V_{RX4}]_{TX3} \qquad [\text{Equation 13}]$$

In Equations 12 and 13, since distances between the stylus pen 20 and RX2 and RX5 are longer than distances between the stylus pen 20 and RX3 and RX4, V_RX2]TX3 and V_RX5]TX3 may ignore the magnitude of the electric signal.

The controller 180 may derive Equation 14 by analogy with Equation 12, Equation 13 and Equation 9 of FIG. 11.

Equation 14

$$\frac{VO_{2,3}]_{TX3}}{VO_{4,5}]_{TX3}} = \frac{V_{RX3}]_{TX3}}{V_{RX4}]_{TX3}} = -\frac{C_{mX3}(x_3)}{C_{mX4}(L_p - x_3)} \quad \text{[Equation 14]}$$

The controller 180 may use the output signals VO_2,3]TX3, VO_4,5]TX3 of the differential amplifiers to detect the ratio of capacitances C_mX3 and C_mX4 (i.e., the second ratio of capacitances) formed between RX3 and RX4 adjacent to the stylus pen.

Afterwards, the controller 180 may apply the AC voltage to TX4 as described in FIGS. 8 to 10. The stylus pen 20 receives electric energy from TX4 through C_mY4. Then, when a preset time (for example, t=ta) elapses, the controller 180 stops applying the AC voltage to TX4. When the application of the AC voltage is stopped, RX3 and RX4 detect an electric signal transmitted from the stylus pen 20. In detail, RX3 receives the electric signal through C_mX3, and RX4 receives the electric signal through C_mX4.

Here, when the electric signal is detected by RX3, two differential amplifiers O_2,3 and O_3,4 connected to RX3 receive the electric signal from RX3 and output signals VO_2,3]TX4 and VO_3,4]TX4. Similarly, when the electric signal is detected by RX4, two differential amplifiers O_3,4 and O_4,5 connected to RX4 receive the electric signal from RX4 and output signals VO_3,4]TX4 and VO_4,5]TX4.

At this time, the controller 180 may detect the output signal of at least one of the differential amplifiers O_2,3, O_3,4 and O_4,5 connected to the RX3 and the RX4. For example, the controller 180 may detect the output signals of the differential amplifiers O_2,3 and O_4,5, which are not adjacent to each other, among the differential amplifiers O_2,3 O_3,4 and O_4,5 connected to the RX3 and the RX4, and the output signals may be as shown in Equations 15 and 16.

Equation 15

$$VO_{2,3]TX4} = V_{RX2]TX4} - V_{RX3]TX4} = -V_{RX3]TX4} \quad \text{[Equation 15]}$$

Equation 16

$$VO_{4,5]TX4} = V_{RX4]TX4} - V_{RX5]TX4} = V_{RX4]TX4} \quad \text{[Equation 16]}$$

Since distances between the stylus pen 20 and RX2 and RX5 are longer than distances between the stylus pen 20 and RX3 and RX4, V_RX2]TX4 and V_RX5]TX4 may ignore the magnitude of the electric signal. The controller 180 may derive Equation 17 by analogy with Equations 13 and 16 and Equation 10 of FIG. 10

Equation 17

$$\frac{VO_{4,5}]_{TX3}}{VO_{4,5}]_{TX4}} = \frac{V_{RX4}]_{TX3}}{V_{RX4}]_{TX4}} = -\frac{C_{mY3}(y_3)}{C_{mY4}(L_p - y_3)} \quad \text{[Equation 17]}$$

The controller 180 may detect the ratio of capacitances C_mY3 and C_mY4 (i.e., the first ratio of capacitances) formed between the stylus pen 20 and TX3 and TX4 adjacent to the stylus pen 20, using the output signals VO_4,5]TX3, VO_4,5]TX4 or VO_2,3]TX3, VO_2,3]TX4 of the differential amplifiers.

Since the Lp value is a physical value which is a value prestored in the mobile terminal, a ratio of y3 to Lp−y3 is inversely proportional to the first ratio of capacitance, and a ratio of x3 to Lp−x3 is inversely proportional to the second ratio of capacitances, the controller 180 may calculate x3 and y3 using this and detect the location of the stylus pen 20 using the calculated x3 and y3.

Similar to that illustrated in FIG. 11, even when using the differential amplifiers, the first ratio of capacitances formed between the stylus pen and two TX electrodes adjacent to the stylus pen may be detected based on an output signal detected by one of differential amplifiers connected to two RX electrodes adjacent to the stylus pen after the AC voltage is applied at different times to the two TX electrodes.

In the present invention, when the differential amplifier is used, the second ratio of capacitances formed between the stylus pen and two RX electrodes adjacent to the stylus pen may be detected based on output signals detected by at least two of differential amplifiers connected to the two RX electrodes adjacent to the stylus pen after the AC voltage is applied to one of two TX electrodes adjacent to the stylus pen.

Meanwhile, in the present invention, at least one of an integrator, a reference voltage supplier, and a multiplexer may be additionally provided between the differential amplifier 140 and the plurality of RX electrodes 52. When the multiplexer is provided between the differential amplifier 140 and the plurality of RX electrodes 52, the number of differential amplifiers can be reduced in the present invention.

According to the present invention, transmission and reception of an electric signal with a stylus pen can be performed by using an existing touch panel. Therefore, a separate power supply unit made of a coil does not have to be provided, which may result in further reducing a fabricating cost and a thickness of a mobile terminal.

In addition, the present invention can supply an electric signal to the stylus pen through capacitive coupling and apply a touch to the touch panel through an electric signal generated in a resonance state. Therefore, the present invention can provide the stylus pen implemented merely by a more simplified circuit, without a separate power supply unit, thereby further reducing a fabricating cost and a weight of the stylus pen.

In addition, the present invention can electrically connect an LC circuit provided in the stylus pen to a pen tip formed of a conductor, so as to increase a magnitude of an electric signal transmitted and received between the stylus pen and the touch panel through capacitive coupling, and accordingly remarkably increase recognition of a touch applied by the stylus pen.

In addition, the present invention can simultaneously drive all of TX electrodes provided in the touch panel to supply an electric signal to the stylus pen. Further, according to the present invention, an electric signal received from the stylus pen can be detected by using the TX electrodes as well as RX electrodes provided in the touch panel, and a location of the stylus pen can be detected based on magnitudes of detected electric signals of the TX and RX electrodes. Therefore, according to the present invention, the location of the stylus pen can be detected remarkably fast, as compared with the related art capacitive touch method of obtaining coordinates of a touch point based on an electric signal detected by RX electrodes while driving the TX electrodes provided in the touch panel one by one.

Further, according to the present invention, voltages having different phases can be simultaneously applied to a plurality of TX electrodes, and the location of the stylus pen can be detected quickly based on a phase of an electric signal received from the stylus pen.

Further, according to the present invention, the location of the stylus pen can be detected using a ratio of capacitances formed between the stylus pen and the TX electrodes and a ratio of capacitances formed between the stylus pen and the RX electrodes, thereby remarkably enhancing accuracy of detecting the location of the stylus pen. The foregoing description may also be applicable not only to a mobile terminal but also to a device (e.g., stationary terminals, such as a digital TV, a desktop computer, a digital signage, a refrigerator, etc.) provided with the touch panel for detecting a touch using a capacitive method and a stylus pen described with reference to FIGS. 2A and 2B.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal comprising:
a touch panel including a plurality of touch panel electrodes;
a stylus pen configured to perform transmission and reception of an electric signal with the touch panel using capacitive coupling and without using a separate power supply to the stylus pen; and
a controller configured to:
when the electric signal is received from the stylus pen through the capacitive coupling, detect a location of the stylus pen with respect to the touch panel based on signal magnitudes of at least two touch panel electrodes from which the electrical signal is detected,
wherein the controller is further configured to:
detect a point where the stylus pen is located between at least two touch panel electrodes based on at least two ratios of signal magnitudes of the at least two touch panel electrodes from which the electrical signal is detected,
wherein the mobile terminal further comprises:
a voltage supplier configured to generate a voltage to be applied to the touch panel,
wherein the controller is further configured to:
apply voltages having different phases to the touch panel, and
detect the location of the stylus pen based on a phase of the electric signal received from the stylus pen, wherein the touch panel electrodes include a plurality of TX electrodes supplying an electric signal to the stylus pen, and a plurality of RX electrodes intersecting with the TX electrodes, and
wherein the controller is further configured to:
apply the voltages having the different phases to the plurality of TX electrodes in a preset manner, and
detect TX electrodes adjacent to the point where the stylus pen is located based on the electric signal detected by a corresponding RX electrode,
wherein the controller is further configured to:
apply the voltages having the different phases to at least some of the plurality of TX electrodes, and
not apply a voltage to TX electrodes, except for the at least some TX electrodes, of the plurality of TX electrodes,
wherein the controller is further configured to:
apply the voltages having the different phases to the plurality of TX electrodes at an interval of a specific number of electrodes,
wherein the stylus pen receives an electric signal from one of the TX electrodes, to which the voltages having the different phases have been applied, and
wherein the controller is further configured to select the one TX electrode based on a phase of a first electric signal when the first electric signal is received from the stylus pen.

2. The terminal of claim 1, wherein the touch panel electrodes include a plurality of TX electrodes, and a plurality of RX electrodes intersecting with the TX electrodes, and
wherein the controller is further configured to:
detect the location of the stylus pen based on at least one of a signal magnitude of a TX electrode, by which the electric signal is detected, of the plurality of TX electrodes, and a signal magnitude of an RX electrode, by which the electric signal is detected, of the plurality of RX electrodes.

3. The terminal of claim 2, wherein the controller is further configured to:
select first and second TX electrodes of the plurality of TX electrodes and first and second RX electrodes of the plurality of RX electrodes, based on a magnitude of the electric signal detected by the plurality of TX electrodes and the plurality of RX electrodes, and
detect the location of the stylus pen using signal magnitudes of the first and second TX electrodes and signal magnitudes of the first and second RX electrodes.

4. The terminal of claim 3, wherein the first and second TX electrodes are two TX electrodes adjacent to a point where the stylus pen is located among the plurality of TX electrodes, and
wherein the first and second RX electrodes are two RX electrodes adjacent to the point where the stylus pen is located among the plurality of RX electrodes.

5. The terminal of claim 1, wherein when the controller applies a voltage having a first phase, among the voltages having the different phases, to one of the plurality of TX electrodes, the controller applies a voltage having a second phase, different from the first phase, to a TX electrode arranged after at least one TX electrode, with respect to the one TX electrode receiving the voltage having the first phase.

6. The terminal of claim 1, wherein the controller is further configured to:

apply the voltages having the different phases to TX electrodes without a voltage applied thereto, of the plurality of TX electrodes, at the interval of the specific number of electrodes.

7. The terminal of claim 6, wherein when receiving a second electric signal different from the first electric signal from the stylus pen, which has received an electric signal from another TX electrode different from the one TX electrode, the controller is further configured to:
select the another TX electrode based on the received second electric signal, and
select two TX electrodes adjacent to the point where the stylus pen is located based on the one TX electrode and the another TX electrode.

8. A mobile terminal comprising:
a touch panel including a plurality of touch panel electrodes;
a stylus pen configured to perform transmission and reception of an electric signal with the touch panel using capacitive coupling and without using a separate power supply to the stylus pen; and
a controller configured to:
when the electric signal is received from the stylus pen through the capacitive coupling, detect a location of the stylus pen with respect to the touch panel based on signal magnitudes of at least two touch panel electrodes from which the electrical signal is detected,
wherein the controller is further configured to:
detect at least two ratios of capacitances formed between at least two touch panel electrodes and the stylus pen, based on the electric signal received from the stylus pen, and
detect a point where the stylus pen is located between the at least two touch panel electrodes based on the detected ratios of capacitances,
wherein the touch panel electrodes include a plurality of TX electrodes supplying an electric signal to the stylus pen, and a plurality of RX electrodes intersecting with the TX electrodes,
wherein the at least two ratios of capacitances comprises a first capacitance ratio foi ined between the stylus pen and the TX electrodes, and a second capacitance ratio formed between the stylus pen and the RX electrodes,
wherein the controller is further configured to:
detect the first and second capacitance ratios based on a signal magnitude detected from at least one of the two RX electrodes adjacent to the stylus pen,
wherein the first capacitance ratio is detected based on magnitudes of electric signals detected at different times by one of the two RX electrodes,
wherein the second capacitance ratio is detected based on signal magnitudes of the two RX electrodes, and
wherein the electric signals detected at the different times comprises:
a first electric signal received by the one RX electrode from the stylus pen after an electric signal is supplied to the stylus pen from one of two TX electrodes adjacent to the stylus pen; and
a second electric signal detected by the one RX electrode after an electric signal is supplied from the one TX electrode and an electric signal is supplied from another TX electrode different from the one TX electrode to the stylus pen.

9. The terminal of claim 8, wherein the first capacitance ratio is a ratio of two capacitances formed between the stylus pen and two TX electrodes adjacent to the stylus pen, of the plurality of TX electrodes, and
wherein the second capacitance ratio is a ratio of two capacitances formed between the stylus pen and two RX electrodes adjacent to the stylus pen, of the plurality of RX electrodes.

10. The terminal of claim 8, further comprising:
a differential amplifier connected to the plurality of RX electrodes in a preset manner and configured to remove noise included in electric signals detected by the plurality of RX electrodes,
wherein the controller is further configured to detect the first and second capacitance ratios based on an output signal of the differential amplifier.

* * * * *